US010710005B2

(12) United States Patent
Ren et al.

(10) Patent No.: US 10,710,005 B2
(45) Date of Patent: Jul. 14, 2020

(54) ADSORBENT MATERIAL

(71) Applicant: Agency for Science, Technology and Research, Singapore (SG)

(72) Inventors: Yi Ren, Singapore (SG); Sing Yang Chiam, Singapore (SG); Lai Mun Wong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 349 days.

(21) Appl. No.: 15/660,626

(22) Filed: Jul. 26, 2017

(65) Prior Publication Data

US 2019/0030455 A1 Jan. 31, 2019

(51) Int. Cl.
*B01D 15/08* (2006.01)
*B01J 20/32* (2006.01)
(Continued)

(52) U.S. Cl.
CPC .......... *B01D 15/08* (2013.01); *B01J 20/0229* (2013.01); *B01J 20/28054* (2013.01); *B01J 20/3236* (2013.01); *C02F 1/288* (2013.01); *C02F 1/281* (2013.01); *C02F 2101/308* (2013.01); *C02F 2305/08* (2013.01)

(58) Field of Classification Search
CPC . B05D 1/00; B05D 1/007; B05D 1/02; B05D 1/18; B05D 5/00; B05D 5/02; B05D 5/04; B05D 5/06; B05D 5/12; B05D 2202/00; B05D 2202/10; B05D 2202/20; B05D 2202/30; B05D 2202/40; C23C 2/00; C23C 2/04; C23C 10/00; C23C 10/04; C23C 10/06; C23C 10/18; C23C 10/28; C23C 16/00; C23C 16/02; C23C 16/0227; C23C 16/06; C23C 16/44; C23C 16/4414; C23C 16/48; C23C 16/50; C23C 18/00; C23C 18/14; C23C 18/08; C23C 18/143; C23C 18/145; C23C 20/00; C23C 20/04
USPC ....... 427/446, 448, 453, 457, 458, 459, 461, 427/466, 467, 468, 469, 470, 47, 2, 473, 427/474, 475, 483, 532, 581, 582, 584, 427/585, 586, 592, 593, 5, 94, 595, 180, 427/209, 248.1, 256, 255.11, 250, 255.12, 427/255.19, 55.21, 271, 287, 331, 472, 427/594, 55.19, 255.21; 210/490, 504, 210/506, 500.25, 502.1
See application file for complete search history.

(56) References Cited

U.S. PATENT DOCUMENTS 4,374,933 A 2/1983 Scholze et al.
5,716,526 A 2/1998 Kelemen et al.
(Continued)

OTHER PUBLICATIONS

Liu et al., J. Mater. Chem. A., 2016, 4, 12380 (Year: 2016).*
(Continued)

*Primary Examiner* — Allison G Fitzsimmons
(74) *Attorney, Agent, or Firm* — Winstead PC

(57) ABSTRACT

An adsorbent material is provided. The adsorbent material comprises a porous, non-particulate substrate comprising pores having a size in the range of about 1 μm to about 1 mm, and a conformal coating film deposited on the porous, non-particulate substrate, wherein the conformal coating film comprises topographical features having a feature size in the range of about 1 nm to about 1 μm. A method of preparing the adsorbent material and an adsorbent device are also provided.

19 Claims, 28 Drawing Sheets

(51) Int. Cl.
 *B01J 20/28* (2006.01)
 *B01J 20/02* (2006.01)
 *C02F 1/28* (2006.01)
 *B01J 20/00* (2006.01)
 *C02F 101/30* (2006.01)

(56) References Cited

U.S. PATENT DOCUMENTS

| | | | |
|---|---|---|---|
| 7,052,591 | B2 | 5/2006 | Gao et al. |
| 7,108,916 | B2 | 9/2006 | Ehmsperger et al. |
| 7,314,569 | B2 | 1/2008 | Cadena C. et al. |
| 7,326,346 | B2 | 2/2008 | Lovell et al. |
| 7,749,394 | B2 | 7/2010 | Mitchell et al. |
| 7,892,436 | B2 | 2/2011 | Gadgil |
| 8,361,920 | B2 | 1/2013 | Dong |
| 9,174,194 | B2 | 11/2015 | Inoue et al. |
| 2002/0031471 | A1* | 3/2002 | Tonkovich ............. B01J 8/0285 423/652 |
| 2006/0121217 | A1 | 6/2006 | Childs et al. |

OTHER PUBLICATIONS

Kim et al., 2014, Procedia Materials Science 4, 305-309. (Year: 2014).*

Shen et al.,"The Effect of Pore Structure of Activated Carbon on the Adsorption of Congo Red and Vitamin B12," Studies in Surface Science and Catalysis, vol. 146, 2013, pp. 779-782.

Mall et al.,"Removal of Congo Red from Aqueous Solution by Bagasse Fly Ash and Activated Carbon: Kinetic Study and Equilibrium Isotherm Analyses," Chemosphere, vol. 61, 2005, pp. 492-501.

Ghaedi et al.,"Comparison of the Efficiency of Palladium and Silver Nanoparticles Loaded on Activated Carbon and Zinc Oxide Nanorods Loaded on Activated Carbon as New Adsorbents for Removal of Congo Red from Aqueous Solution: Kinetic and Isotherm Study," Materials Science and Engineering C, vol. 32, 2012, pp. 725-734.

Lorenc-Grabowska et al., "Adsorption Characteristics of Congo Red on Coal-Based Mesoporous Activated Carbon," Dyes and Pigments, vol. 74, 2007, pp. 34-40.

Ghaedi et al., "Preparation of Low Cost Activated Carbon from Myrtus Communis and Pomegranate and Their Efficient Application for Removal of Congo Red from Aqueous Solution," Spectrochimica Acta A, vol. 86, 2012, pp. 107-114.

Namasivayam et al, "Removal of Congo Red from Water by Adsorption onto Activated Carbon Prepared from Coir Pith, an Agricultural Solid Waste," Dyes and Pigments, vol. 54, 2002, pp. 47-58.

Tor et al., "Removal of Congo Red from Aqueous Solution by Adsorption onto Acid Activated Red Mud," Journal of Hazardous materials, vol. B138, 2006, pp. 409-415.

Chatterjee et al., "Adsoprive Removal of Congo Red, a Carcinogenic Textile Dye by Chitosan Hydrobeads: Binding Mechanism, Equilibrium and Kinetics," Colloids and Surfaces A: Physicochem. Eng. Aspects, vol. 299, 2007, pp. 146-152.

Vimonses et al, "Kinetic Study and Equilibrium Isotherm Analysis of Congo Red Adsorption by Clay Materials," Chemical Engineering Journal, vol. 148, 2009, pp. 354-364.

Rao et al., "Facile Additive-Free Synthesis of Iron Oxide Nanoparticles for Efficient Adsorptive Removal of Congo Red and Cr(IV)," Applied Surface Science, vol. 292, 2014, pp. 174-180.

Yu et al., "Template-Free Preparation of Mesoporous Fe2O3 and its Application as Absorbents," Journal of Physical Chemistry C, vol. 112, 2008, pp. 13378-13382.

Afkhami et al., "Adsorptive Removal of Congo Red, a Carcinogenic Textile Dye, from Aqueous Solutions by Maghemite Nanoparticles," Journal of Hazardous Materials, vol. 174, 2010, pp. 398-403.

Wei et al., "Facile Template-Free Fabrication of Hollow Nestlike α-Fe2O3 Nanostructures for Water Treatment," ACS Applied Materials & Interfaces, vol. 5, 2013, pp. 598-604.

Li et al., "Magnetic Polydopamine Decorated with Mg—Al LDH Nanollakes as a Novel Bio-Based Adsorbent for Simultaneous Removal of Potentially Toxic Metals and Anionic Dyes, " Journal of Materials Chemistry A, vol. 4, 2016, pp. 1737-1746.

Lei et al., "Hierarchical NiO—SiO2 Composite Hollow Microspheres with Enhanced Adsorption Affinity Towards Congo Red in Water," Journal of Colloid and Interface Science, vol. 466, 2016, pp. 238-246.

Mishra et al., "Study of Removal of Azo Dye by Functionalized Multi Walled Carbon Nantubes," Chemical Engineering Journal, vol. 162, 2010, pp. 1026-1034.

"Recycling Activated Carbon," http://infohouse.p2ric.org/ref/20/19926/P2_Opportunity_Handbook/9-II-4.html, 1999, pp. 1-4.

Teoh et al., "Kinetic and Isotherm Studies for Lead Adsorption from Aqueous Phase on Carbon Coated Monolith," Chemical Engineering Journal, vol. 217, 2013, pp. 248-255.

Ferrero et al., "Adsorption of Chromate and Cupric Ions onto Chitosan-Coated Cotton Gauze," Carbohydrate Polymers, vol. 110, 2014, pp. 367-373.

Kumar et al., "Arsenic Adsorption by Iron-Aluminium Hydroxide Coated onto Macroporous Supports: Insights from X-ray Absorption Spectroscopy and Comparison with Granular Ferric Hydroxides," Journal of Hazardous Materials, vol. 302, 2016, pp. 166-174.

Xu et al., "Synthesis and Characterization of Iron Oxide-Coated Silica and its Effect on Metal Adsorption," Journal of Colloid and Interface Science, vol. 282, 2005, pp. 11-19.

Walther et al., "A New PM Process for Manufacturing of Alloyed Foams for High Temperature Applications," Proceedings of the World Powder Metallurgy Congress and Exhibition, World PM 2010, Florence, Italy, Oct. 2010, pp. 1-8.

* cited by examiner

Textile Effluent Treatment b    Congo red

R refers to Congo red molecule minus one -SO₃

Chelating bidentate    Bridging bidentate    Unidentate

ADSORBENT MATERIAL

TECHNICAL FIELD

Various embodiments refer to an adsorbent material, a method of preparing an adsorbent material, and an adsorbent device.

BACKGROUND

Waste effluent treatment is important to address environmental pollution. Treatment of water is also increasingly important to mitigate problems with scarcity of drinking water. Over the years, many methods have been developed for the treatment of water, such as filtration, centrifugation, precipitation, electrolysis, and adsorption.

Among the methods developed, adsorption of contaminants is a highly cost effective method to remove soluble pollutants, such as heavy metal ions and dyes. Adsorption is a surface phenomenon, and performance of adsorbent technologies may largely be affected by effective surface area of the materials. Therefore, state-of-the-art adsorbent materials are typically in the form of powder or granule to maximize the surface area to mass ratio. Consequently, filtration setup is inevitably required during adsorption and regeneration operations to contain and separate the adsorbent material from treated water, so as to avoid secondary contamination of the treated water by the adsorbent material. This added processing cost of filtration became increasingly significant as smaller and smaller adsorbent materials are employed to increase the surface area for higher adsorptive capacity. Such separation processes also introduce added complexity.

Adsorption technologies using activated carbon, for example, are already in use in the industry, and remain popular due to abundance of the material. However, the activation process of carbon is expensive and the adsorption of the contaminants is essentially a physisorption process. Such a mechanism is challenging in terms of its stability, selectivity, and effectiveness in the removal of bulky contaminants.

The trend towards nanomaterials, such as hollow spheres, nanoflakes, nanorods, and hierarchical nanostructures and nanoparticles, is currently not realized despite discovery and engineering of high performance adsorbents, as fear of leeching and inability to remove such nanomaterials prevent their implementation. The nanomaterials have to be effectively contained or removed after the treatment process. Any failure in containing or removing the nanoparticles increases the risk of introducing nanoparticles into the treated water. This is highly detrimental as nanomaterials can have chronic or acute health effects when ingested. This increases the apprehension towards the use of such adsorption technologies and hinders their widespread adoption. Moreover, high temperatures, surfactants or toxic organic compounds are often needed in the synthesis for the creation of the nanostructures that are not environmentally friendly.

So far, the use of nanomaterials still demands granulation or pre-coagulation to bring the nanoparticles into micron size for possible extraction through filtering. This approach is counter-productive and defeats the initial purpose of using nanomaterials because coagulation inevitably reduces the effective surface area.

In view of the above, there exists a need for an improved method for removing pollutants that addresses or at least alleviates one or more of the above problems.

SUMMARY

In a first aspect, an adsorbent material is provided. The adsorbent material comprises
a) a porous, non-particulate substrate comprising pores having a size in the range of about 1 µm to about 1 mm, and
b) a conformal coating film deposited on the porous, non-particulate substrate, wherein the conformal coating film comprises topographical features having a feature size in the range of about 1 nm to about 1 µm.

In a second aspect, a method of preparing an adsorbent material is provided. The method comprises
a) providing a porous, non-particulate substrate comprising pores having a size in the range of about 1 µm to about 1 mm, and
b) depositing a conformal coating film on the porous, non-particulate substrate, wherein the conformal coating film comprises topographical features having a feature size in the range of about 1 nm to about 1 µm.

In a third aspect, an adsorbent device is provided. The adsorbent device comprises
a) a support structure, and
b) a plurality of an adsorbent material attached to the support structure, the adsorbent material comprising a porous, non-particulate substrate comprising pores having a size in the range of about 1 µm to about 1 mm, and a conformal coating film deposited on the porous, non-particulate substrate, wherein the conformal coating film comprises topographical features having a feature size in the range of about 1 nm to about 1 µm.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1A:
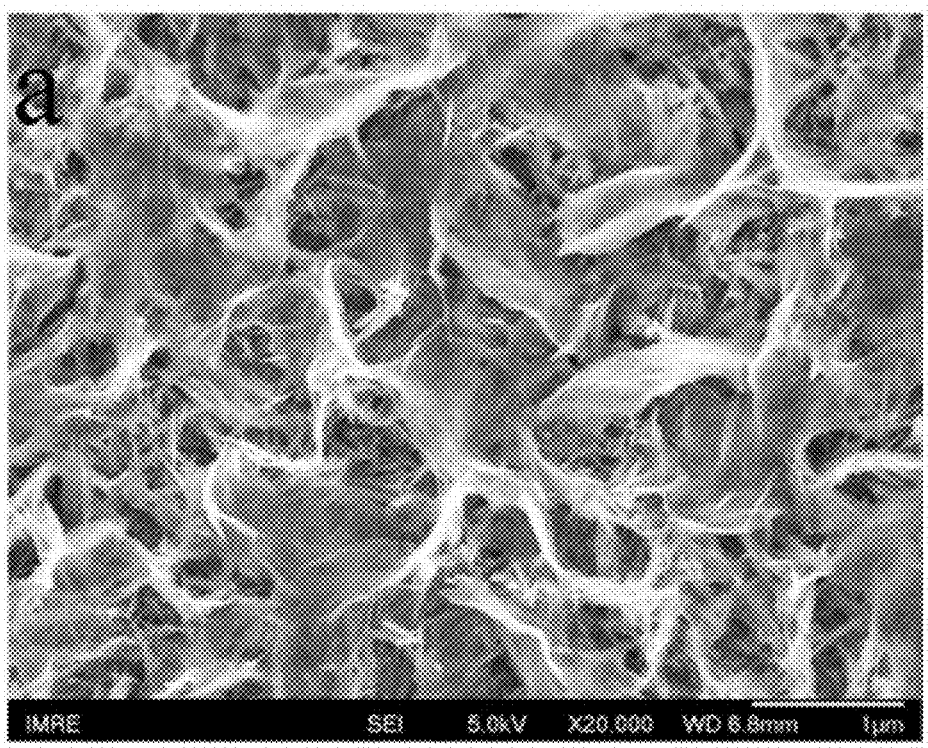
FIG. 1A is a scanning electron microscopy (SEM) image of a surface of an iron (III) oxide-hydroxide (FeOOH) film deposited with 0.5 M ammonium iron(II) sulfate ($(NH_4)_2Fe(SO_4)_2$) and 1 M sodium acetate ($CH_3COONa$) under a high growth rate according to an embodiment. Large and flaky structures with poor adhesion and uniformity were observed. Scale bar represents 1 µm.

By depositing a conformal coating film comprising topographical features having a feature size of about 1 μm or less, such as in the range of about 1 nm to about 1 μm, on a porous, non-particulate substrate comprising pores having a size in the range of about 1 μm to about 1 mm, an adsorbent material, which is capable of high-capacity and filtration-free removal of contaminants or pollutants from waste effluent, may be obtained. The inventors have demonstrated performance superior to state-of-the-art adsorbent materials used in industry, where high removal efficiencies of more than 140 mg g$^{-1}$ were achieved. This is surprising since immobilizing adsorbent material as a coating on large and bulky substrate has been viewed as an action that would result in loss of surface area and thus significantly affects adsorptive capacity thus far, and is generally considered unacceptable in practical usage.

Advantageously, the adsorbent material is versatile in that it may be packed in various ways to enhance packing density, with object to maximize removal efficiency of contaminants.

As the contaminants are adsorbed hence immobilized on the conformal coating film, which is in turn deposited on the porous, non-particulate substrate, removal of the contaminants from waste effluent may be carried out in a simple and thorough manner by insertion and extraction. This may ease processing, as use of separation processes such as filtration required in state of the art methods involving nanomaterials are avoided. Furthermore, the conformal coating film may be prepared using environmentally friendly methods, such as electrodeposition, which may be carried out at ambient conditions without heating, making it highly attractive and scalable. The conformal coating film disclosed herein is able to achieve good adhesion with a high surface area to mass ratio.

With the above in mind, various embodiments refer in a first aspect to an adsorbent material. The adsorbent material may comprise a porous, non-particulate substrate comprising pores having a size in the range of about 1 μm to about 1 mm, and a conformal coating film deposited on the porous, non-particulate substrate, wherein the coating film comprises topographical features having a feature size in the range of about 1 nm to about 1 μm.

As used herein, the term "adsorbent material" refers to a substance which is able to adhere or adsorb specific substances or molecules on a surface of the substance. In various embodiments, specific substances or molecules, such as contaminants or pollutants from waste effluent, may be adsorbed on a surface of the conformal coating film comprised in the adsorbent material.

The adsorbent material may comprise a porous, non-particulate substrate having pores having a size in the range of about 1 μm to about 1 mm.

As used herein, the term "non-particulate" refers generally to a material that is not in a powder or particulate form. For example, a non-particulate material may refer to a material that is not a powder, a fragment, a granule, a particle, nor a grain. In other words, a non-particulate substrate may be one that provides some form of continuity, so that pollutant or contaminant material that is inserted into the adsorbent material may be extracted easily without using filters, nets or any other holder/container equipment, which may otherwise be required when particulate substrates are used.

As presently disclosed, the non-particulate substrate may have at least one dimension that is about 5 cm or more, such as about 10 cm or more, about 50 cm or more, about 1 m or more, or about 5 m or more, while not having an upper limit to the dimension. A substrate which does not have at least one dimension that is about 5 cm or more may render removal of the pollutant or contaminant from the substrate by insertion and extraction difficult, or result in an impractical volume of water being treated in applications relating to water treatment. The at least one dimension of the non-particulate substrate may refer to a dimension along its periphery such as length, breadth, or thickness, or a cross-sectional length of the non-particulate substrate, defined herein as a maximal length of a line segment passing through the centre and connecting two points on the periphery of the non-particulate substrate.

One, two, or more dimensions of the non-particulate substrate may be about 5 cm or more. In some embodiments, only one dimension of the non-particulate substrate is about 5 cm or more, while the other dimensions are less than about 5 cm. For example, when the non-particulate substrate is rectangular in shape, the non-particulate substrate may have a length of about 5 cm or more, while the other dimensions such as breadth or thickness of the substrate may be more than or less than 5 cm. As another example, when the non-particulate substrate is spherical in shape, the non-particulate substrate may have a diameter that is about 5 cm or more. When the non-particulate substrate is rod-shaped, for example, the length of the non-particulate substrate may be about 5 cm or more, while diameter of the non-particulate substrate may be more than or less than 5 cm. As a further example, when the non-particulate substrate is irregularly-shaped, the non-particulate substrate may have a cross-sectional length that is about 5 cm or more.

The non-particulate substrate may be porous. The term "porous" as used herein is used to describe a material or structure having a plurality of pores, holes, openings, bores, apertures, spaces, perforations, or intervals, which may or may not allow fluid to flow through. The pores of the porous, non-particulate substrate may be largely interconnected to one another, and may be of any shape or size. By the term "largely interconnected to one another", it means that more than 50% of the pores, such as more than 60%, more than 70%, or more than 80% of the pores, in the porous, non-particulate substrate are interconnected to one another, and may furthermore be in fluid communication with each other.

In various embodiments, the pores of the porous, non-particulate substrate are largely interconnected to one another. By virtue of the pores being largely interconnected to one another, as opposed to individual, discrete pores, this provides accessibility of liquid to the internal surfaces of the non-particulate substrate. In some embodiments, the pores of the porous, non-particulate substrate are interconnected to one another to form through pores, meaning that a fluid that is introduced via one pore of the porous, non-particulate substrate is able to flow out from the porous, non-particulate substrate via one or more different pores. Characteristic of the pores, for example, the porosity, pore diameter, pore volume, may be readily determined as within the knowledge of the person of average skill in the art.

In various embodiments, the pores of the porous, non-particulate substrate have a size in the range of about 1 μm to about 1 mm. Size of the pores of the porous, non-particulate substrate may refer to the size of each pore in the porous, non-particulate substrate. This allows maximizing surface area for subsequent deposition of a coating layer, thereby providing reasonable capacity for practical usage, while not subjecting a liquid in use to diffusion regime of typical porous materials which may significantly slow down adsorption speed.

In this regard, the porous, non-particulate substrate may have a surface area that is about 10 cm$^2$ or more, per cm$^3$ of the volume of the porous, non-particulate substrate. For example, the porous, non-particulate substrate may have a surface area that is more than 10 cm$^2$/cm$^3$ of the volume of the porous, non-particulate substrate, such as more than 15

$cm^2/cm^3$, more than 20 $cm^2/cm^3$, more than 25 $cm^2/cm^3$, more than 30 $cm^2/cm^3$, more than 35 $cm^2/cm^3$, more than 40 $cm^2/cm^3$, or more than 50 $cm^2/cm^3$ of the volume of the porous, non-particulate substrate.

The size of the pores may, for example, be in the range of about 5 µm to about 1 mm, about 10 µm to about 1 mm, about 50 µm to about 1 mm, about 100 µm to about 1 mm, about 500 µm to about 1 mm, about 800 µm to about 1 mm, about 1 µm to about 800 µm, about 1 µm to about 500 µm, about 1 µm to about 300 µm, about 1 µm to about 200 µm, about 1 µm to about 100 µm, about 100 µm to about 800 µm, about 200 µm to about 600 µm, or about 400 µm to about 600 µm. Choice of the size of pores may depend on, for example, type of pollutant, concentration of pollutant, and/or desired speed of removal of the pollutant.

Choice of material for the porous, non-particulate substrate is not particularly limited, so long it comprises pores having a size in the range of about 1 µm to about 1 mm, and may for example be selected from the group consisting of a metal foam, a textile, a polymer membrane, a ceramic, and combinations thereof.

In various embodiments, the porous, non-particulate substrate is a metal foam or a metal oxide such as indium tin oxide.

In some embodiments, the porous, non-particulate substrate is a metal foam. As used herein, the term "metal foam" refers generally to an open cell, porous metallic structure. The metallic portion of the metal foam, for example, may be in the form of a connected lattice of metal, wherein the metal may define boundaries of cells, with interiors of the cells being voids. Examples of metal foam include, but are not limited to, nickel foam, copper foam, aluminum foam, and foams formed from alloys of the aforesaid metals.

In various embodiments, the metal foam is a nickel foam.

The porous, non-particulate substrate may be non-rigid, which means that the porous, non-particulate substrate is capable of being deformed or rolled up into various configurations depending on intended application.

A conformal coating film may be deposited on the porous, non-particulate substrate. As used herein, the term "conformal" refers to the coating film being deposited on the porous, non-particulate substrate such that the coating film at least substantially follows, or conforms to the contours of the underlying porous, non-particulate substrate. In conforming to the contours of the underlying porous, non-particulate substrate, the conformal coating film may or may not maintain the pores and/or through pores of the porous, non-particulate substrate, depending on thickness of the conformal coating film and/or pore size of the porous, non-particulate substrate. For example, in embodiments wherein thickness of the conformal coating film is sufficiently thin, pores and/or through pores of the porous, non-particulate substrate are not covered in their entirety by the conformal coating film, thereby maintaining at least most or all of the pores and/or through pores of the underlying porous, non-particulate substrate. Conversely, in embodiments wherein thickness of the conformal coating film is sufficiently thick, some of the pores and/or through pores, of the porous, non-particulate substrate may be covered or sealed. In various embodiments, the conformal coating film is attached to the porous, non-particulate substrate.

The conformal coating film may comprise a substance adapted to adsorb a dye molecule by chemisorption. For example, the conformal coating film may comprise a substance adapted to adsorb a dye molecule through complexation via at least one of a chelating bidentate, bridging bidentate, or unidentate bonding with the dye molecule. Examples of such substances may include a metal oxide such as iron oxide, nickel oxide, tungsten oxide, and manganese oxide, and/or a metal hydroxide such as iron hydroxide, nickel hydroxide, and zinc aluminum double hydroxide.

In various embodiments, the conformal coating film comprises at least one of a metal oxide or a metal hydroxide. For example, metal oxides or hydroxides, such as $MnO_2$, $WO_3$, $Fe_2O_3$, NiO, FeOOH and/or $Ni(OH)_2$, may be comprised in the conformal coating film. Use of metal oxides or metal hydroxides is advantageous as they may possess stability, and may be functionalized to allow selectivity towards different contaminants, such as organic dyes, and heavy metal oxyanions.

In some embodiments, the conformal coating film comprises FeOOH. Advantageously, iron oxide/hydroxide is an abundant material that is low in cost and environmentally benign. More importantly, it has excellent adsorption capacity and is approved for use in water treatment. Furthermore, it provides stability as a result of its stable chemisorption process.

The conformal coating film may comprise topographical features having a feature size of about 1 µm or less, such as in the range of about 1 nm to about 1 µm. As used herein, the term "topographical feature" may generally refer to a type of structure that is deposited along or integral with the surface of the conformal coating film, so as to result in a geometric deviation from smoothness of a substrate surface. Examples of topographical features include, but are not limited to, protrusions, depressions, pits, projections, trenches, fissures, crevices, particles, islands, closed or open cell structures, or combinations thereof.

It is specified herein that no through pores are necessary in the presently disclosed conformal coating film, as the conformal coating film disclosed herein operates via a different mechanism of removing contaminants from waste effluent by utilizing the high surface area provided by (i) topographical features having a feature size of about 1 µm or less, and/or (ii) the porous, non-particulate substrate, for enhanced adsorption capacity. Accordingly, in various embodiments, the conformal coating film does not contain any through pores. This is in contrast to materials such as membrane where through pores are necessarily present to allow fluid to filter or to flow through. Advantageously, the increased surface area provided by the topographical features of the conformal coating film and the increased surface area provided by the pores of the porous, non-particulate substrate may act in tandem to provide a synergistic effect for enhanced adsorption capacity.

In some embodiments, the conformal coating film is a continuous coating film. By the term "continuous", it is meant that the conformal coating film is substantially non-fragmented. For example, more than 50%, such as more than 60%, more than 70%, more than 80%, or more than 90% by volume of the conformal coating film are interconnected to form the continuous coating film. As mentioned above, the non-particulate substrate referred to herein may be one that provides some form of continuity, so that material that is inserted into the adsorbent material may be extracted easily without using filters, nets or any other holder/container equipment, which may otherwise be required when particulate substrates are used. Accordingly, while the conformal coating film may comprise topographical features as described above, the conformal coating film may nevertheless form a continuous film on the porous, non-particulate substrate.

This stands in contrast to existing high surface area materials used for surface/coating modifications, which are discontinuous in form. By the term "discontinuous", it refers to materials that cannot be easily removed without aid from filters, net, or membranes, and which may be in the form of particles, powder, granule, and/or small pieces of variable sizes that require different level of filtrations or removal.

In various embodiments, the topographical features on the conformal coating film have a feature size in the range of about 1 nm to about 1 µm, such as about 5 nm to about 1 µm, about 10 nm to about 1 µm, about 100 nm to about 1 µm, about 200 nm to about 1 µm, about 500 nm to about 1 µm, about 1 nm to about 800 nm, about 1 nm to about 500 nm, about 1 nm to about 300 nm, about 1 nm to about 100 nm, about 10 nm to about 800 nm, about 100 nm to about 600 nm, or about 300 nm to about 600 nm.

In this regard, feature size of the topographical features may be defined by the minimum lateral dimension of the feature, such as length, width, or diameter measured in the x-y direction. In the case of non-isotropic lateral feature, for example, the feature size is defined as the smallest lateral dimension of the topographical feature. For illustration purposes, feature size of a crack having a minimum separation distance of 2 nm and a length of 1 µm is 2 nm.

Depth or height of the topographical features measured in the z-direction, such as the peak-to-valley height of the topographical features, are referred to herein as the profile thickness of the topographical features. For illustration purposes only, topographical features such as cylindrical cones may have a feature size corresponding to diameter of the cone, and a profile thickness corresponding to height of the cone.

Generally, topographical features having a smaller feature size and a larger profile thickness result in increased capacity for pollutant removal, all else remaining constant. This may be due to higher surface area provided by the vertically elongated shapes of such features. On the other hand, smaller feature sizes may impact mechanical stability of the topographical features, with the mechanically unstable topological features collapsing to form structures of a smaller profile thickness.

In specific embodiments, the topographical features on the conformal coating film have a feature size in the range of about 10 nm to about 200 nm. Profile thickness of the topographical features are not particularly limited, but are generally larger than the feature size.

In some embodiments, the topographical features on the conformal coating film further comprises fin-like nanostructures. The conformal coating film may, for example, comprise fin-like nanostructures having a profile thickness in the range of about 100 nm to about 400 nm. As used herein, the term "fin-like" refers to generally vertically-oriented structures or projections extending from the conformal coating film. In this regard, profile thickness of the fin-like nanostructures refers to the distance from which the fin-like nanostructures extend from surface of the conformal coating film. As discussed in Example 8 below, such fin-like nanostructures may give rise to higher specific surface area, translating into high removal efficiencies of contaminants.

The conformal coating film may have a thickness in the range of about 1 nm to about 1 µm, such as about 10 nm to about 1 µm, about 50 nm to about 1 µm, about 100 nm to about 1 µm, about 200 nm to about 1 µm, about 500 nm to about 1 µm, about 1 nm to about 800 nm, about 1 nm to about 500 nm, about 1 nm to about 300 nm, about 200 nm to about 400 nm, about 300 nm to about 400 nm, about 200 nm to about 350 nm, about 200 nm to about 300 nm, about 250 nm to about 350 nm, or about 300 nm. Thickness of the conformal coating film may be measured from the point at which the conformal coating film contacts the porous, non-particulate substrate, and including the topographical features such as the fin-like nanostructures. In some embodiments, the conformal coating film comprises or consists of the topographical features such as the fin-like nanostructures discussed above.

In specific embodiments, the conformal coating film has a thickness in the range of about 200 nm to about 400 nm. It was surprisingly found by the inventors that the coating film as exemplified herein has an optimal thickness of about 300 nm, as surface area of the coating film may be maximized at this thickness, where densification of the coating film has not taken place.

Various embodiments refer in a second aspect to a method of preparing an adsorbent material.

Advantageously, the method disclosed herein allows depositing of a conformal coating film on a porous, non-particulate substrate to be carried out without clogging the pores of the substrate. In so doing, a uniform conformal coating film may be formed throughout the surface of the porous, non-particulate substrate. Furthermore, since both the deposition and subsequent use of the substrate in pollutant removal may be carried out in an aqueous medium, this may mean that the coating would not be diffusively limited.

Furthermore, the method of preparing an adsorbent material disclosed herein results in increase in effective surface area according to embodiments. The method also allows for coating on sub-millimeters or micron pore sized porous substrate for increased surface area. These in combination translate into a high performance adsorbent device disclosed herein. The approach is inventive as state of the art coating technologies for adsorbent materials are focused on modification of surfaces for enhancing the selectivity of existing adsorbent materials, including chemical modification, attachment, and doping, usually on particle materials itself. It is not intuitive to tune the effective coated surface area as it was not previously known that performance exhibited by a coating film can be as effective as nanomaterials.

The method may comprise providing a porous, non-particulate substrate comprising pores having a size in the range of about 1 µm to about 1 mm. Examples of suitable porous, non-particulate substrate have already been discussed above.

The method may comprise depositing a conformal coating film on the porous, non-particulate substrate, wherein the conformal coating film comprises topographical features having a feature size in the range of about 1 nm to about 1 µm.

Depositing the conformal coating film on the porous, non-particulate substrate may, for example, be carried out using a conformal deposition method such as electrodeposition, hydrothermal growth, chemical bath deposition and/or sol gel deposition.

In various embodiments, depositing the conformal coating film on the porous, non-particulate substrate is carried out by electrodeposition. As used herein, the term "electrodeposition" refers to precipitation of a material at an electrode as a result of passage of an electric current through a solution or suspension of the material. Advantageously, electrodeposition allows for coating into the sub-millimeter or micron sized pores of the porous, non-particulate substrate, without clogging caused by particles blockage or precipitation during solution growth.

Use of electrodeposition to form the conformal coating film may involve controlling processing parameters, such as coating solution composition, pH value, electrodeposition voltage and current, coating duration, and/or solution stability. The method of preparing the adsorbent material may therefore involve a multitude of factors that may affect morphology of the resultant conformal coating film, and its adhesion to the underlying porous, non-particulate substrate.

For example, there may be competition between field effects driven extension of surface roughness and resistance driven filling up of pores, which may in turn affect surface area of the conformal coating film. It has been found by the inventors that this competition may be tilted in favor of extension growth which translates into maximize surface area of the conformal coating film, through control of solution pH and at the same time maximizing electropotential, so as to enable extension growth or elongation growth of the conformal coating film. A suitable pH may, for example, restrict bottom-up pore filling of the pores in the underlying porous, non-particulate substrate through diffusion limitation, while at the same time, control adhesion and clogging of the porous substrate. In so doing, conformal growth of the coating film on the porous, non-particulate substrate by solution method may be achieved.

In various embodiments, depositing the conformal coating film on the porous, non-particulate substrate comprises electrodepositing a substance adapted to adsorb a dye molecule by chemisorption on the porous, non-particulate substrate. Examples of suitable substances that may be used have already been discussed above.

In some embodiments, depositing the conformal coating film on the porous, non-particulate substrate comprises electrodepositing at least one of a metal oxide or a metal hydroxide on the porous, non-particulate substrate. Examples of suitable metal oxide and metal hydroxide that may be used have already been discussed above.

In specific embodiments, depositing the conformal coating film on the porous, non-particulate substrate comprises electrodepositing FeOOH on the porous, non-particulate substrate.

As mentioned above, use of electrodeposition to form the conformal coating film may involve controlling processing parameters, such as coating solution composition, pH value, electodeposition voltage and current, coating duration, and/or solution stability.

For example, the electrodeposition may be carried out at a pH in the neutral range or only slightly acidic. An alkaline pH may cause precipitation, which is undesirable, and a highly acidic pH may case etching of the as-grown coated film. Accordingly, the electrodeposition in various embodiments is carried out at a pH in the range of about 6 to about 7, such as about 6.2 to about 7, about 6.4 to about 7, about 6 to about 6.8, or about 6.4 to about 6.6. In specific embodiments, the electrodeposition is carried out at a pH of about 6.5.

The electrodeposition may be carried out under constant potential. Advantageously it has been found by the inventors that carrying out the electrodeposition under constant potential may provide good controllability and uniformity of the resulting conformal coating film. In contrast thereto, carrying out of the electrodeposition under constant current may result in a conformal coating film that is less uniform due to non-uniform distribution of the electric field across the substrate driven by the need to maintain a constant current.

The electrodeposition may be carried out in a purged nitrogen environment, so as to prevent precipitation.

In various embodiments, the electrodeposition is carried out without heating. As mentioned above, the coating film may be prepared at ambient conditions without heating, making it highly attractive and scalable.

Various embodiments refer in a third aspect to an adsorbent device comprising a support structure, and a plurality of an adsorbent material attached to the support structure, the adsorbent material comprising a porous, non-particulate substrate comprising pores having a size in the range of about 1 μm to about 1 mm, and a conformal coating film deposited on the porous, non-particulate substrate, wherein the conformal coating film comprises topographical features having a feature size in the range of about 1 nm to about 1 μm.

The support structure may be selected from materials or design having sufficient mechanical strength and stability to provide ease of handling and fixation of the adsorbent material. Examples of such material include, but are not limited to, metals, ceramics and/or polymers. In various embodiments the plurality of the adsorbent material are in the form of rolled sheets and/or parallel sheets.

As mentioned above, the adsorbent device may allow easy removal of waste and pollutant, without the need to filter out the adsorbent material such as in cases where nanomaterials are used.

The adsorbent device may work by simple insertion-extraction or flow-through with ability to easily remove the adsorbent material via an extractable substrate. The porous substrate may be in the sub-millimeters or micron pore sizes to avoid diffusive regimes for fast adsorbent-pollutant interaction. The extractable porous substrate can also be soft materials such that the resultant adsorbent can be reshaped into various form of high density to be used effectively as a dip-in adsorbent device or in-line adsorptive cartridge without any filtration.

Various embodiments disclosed herein may act as a supplement to membrane technology. By using different materials that are targeted at different pollutants, the adsorbent material disclosed herein may totally replace state of the art membranes.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

In this work, a new approach in adsorption technologies by using coated thin films for immobilization of the adsorbed contaminants was explored.

In embodiments, a high adsorption capacity of 144 mg g$^{-1}$ for Congo red was demonstrated using coated FeOOH porous thin films, demonstrating viability of such an approach. The coated film achieved unprecedented ease in separating the pollutant through immobilization, which is important for practical applications. In addition, the film was grown using an environmentally friendly method at room temperature, making it highly attractive and scalable.

The inventors have also reported the kinetics and mechanism of the adsorption process of Congo red on iron hydroxide that were previously not well understood. It was found that they were governed by a surface limited chemisorption reaction, through a unidentate complex bonding of Fe with the sulfonic group of the dye. The implication of such a mechanism was discussed by showing how the structure of the coated film disclosed herein played a key role in affecting the adsorption capacity, and the theoretical limit of FeOOH adsorption.

The adsorbent material disclosed herein is highly counterintuitive, as the need for active sites and accessible diffusion pathways translates into a high surface area requirement which is difficult to achieve with coated thin films.

The present technology utilized a hierarchical or porous thin film approach. A green synthesis method, using a scalable, room-temperature electrochemical deposition approach was used to fabricate nanostructured thin films with good adsorption capacity. This compares favorably to state of the art methods to prepare porous coated films in which a high temperature process is usually required. The use of high temperatures in state of the art methods is not ideal for applications in adsorption technologies as it excludes relevant substrates such as polymers or fibers that can be of great importance in water treatment.

In various embodiments, the proposed technology comprises a device which enhances its adsorptive capacity in two ways. The first is achieved by the use of a porous extractable substrate, while the second is achieved by the use of porous coating through controlling coating formulation. Use of the continuous and extractable porous substrate allows for filter-free extraction process based on a simple insertion-extraction process, or for use even as a flow-through process. The second enhancement is the use of porous coatings. The inventors demonstrated possibility in maximization of surface area of the coating for the pollutant removal using wet techniques suitable for coating on porous substrate. The combination of which, is a device that can effectively removal pollutants, without any need for filtration. The coating methodology is a solution approach and the achievement of a high capacity is a combined control of coating solution composition and pH, the electro-deposition voltage and current, coating duration and solution stability.

Figure 18:
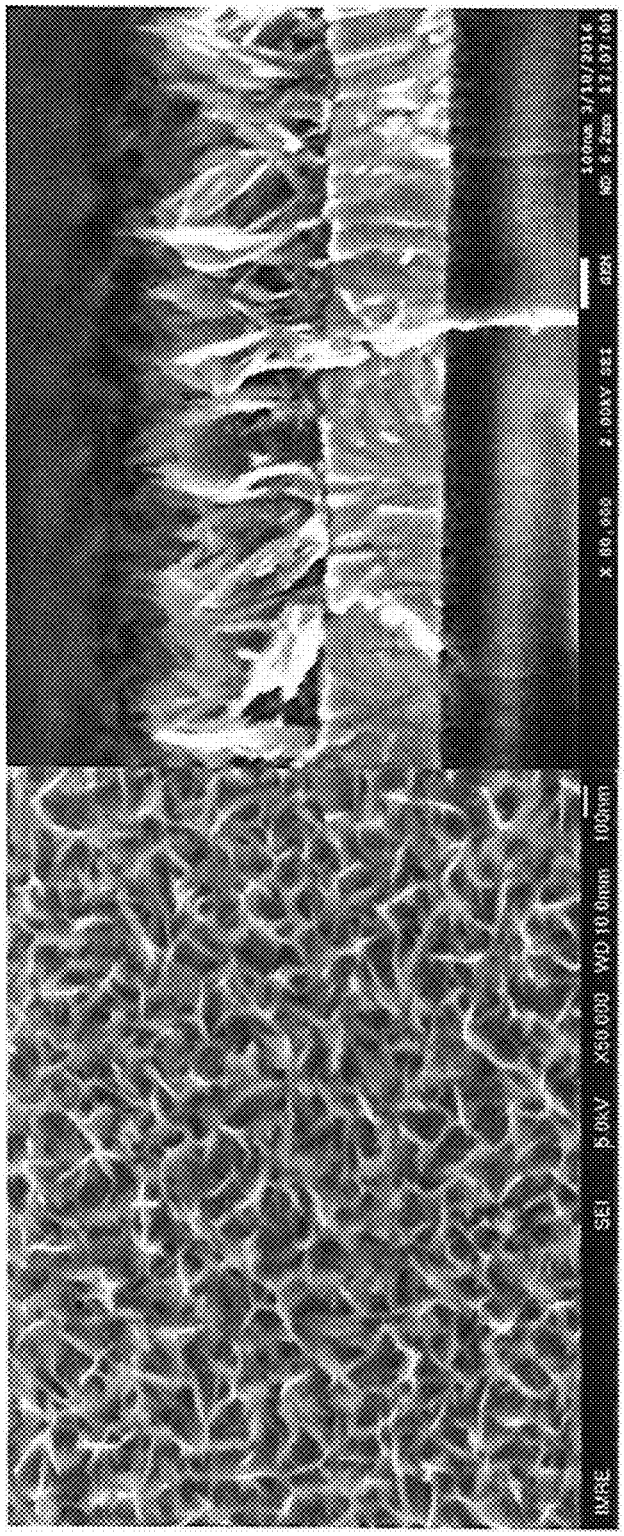
FIG. 18 shows top (left) and cross-sectional (right) SEM view of the metal hydroxide coating according to an embodiment showing sub-micron features and high surface area to mass ratio. Scale bar represents 100 nm.

An example of the achieved porous coating with submicron topographical features on a planar substrate is shown in FIG. 18.

Because of the versatility and control in this method, the porous substrate may be extended to soft fabric cloths, ceramic and polymeric materials or membranes, to realize the filter-free design.

EXAMPLE 1

Materials

All the chemicals purchased from Sigma-Aldrich were of analytical grade and used as received without further purification. $(NH_4)_2Fe(SO_4)_2$, $CH_3COONa$, Congo red $(C_{32}H_{22}N_6O_6S_2Na_2)$, ethanol, NaOH, indium tin oxide (ITO) on a glass substrate (8 to 12Ω sq$^{-1}$), Ni foam (0.5Ω sq$^{-1}$), and deionized water with an electronic resistance of 18.2 MΩ were used.

EXAMPLE 2

Electrodeposition of the FeOOH Film

The deposition bath contained 100 mL mixture of $(NH_4)_2Fe(SO_4)_2$ and $CH_3COONa$ solution. As the bath had a tendency to slowly oxidize in air, the whole solution preparation and electrodeposition process were carried out in a glovebox under a nitrogen ($N_2$) atmosphere. The dry weight of each substrate before and after electrodeposition was measured.

The electrodeposition was carried out using a Metrohm Autolab potentiostat with a standard Ag/AgCl reference electrode and a Pt foil counter electrode. The conductive substrates were cleaned with acetone, isopropanol (IPA), and deionized water before electrodeposition. Deposition was carried out at 0.5 V against a Ag/AgCl electrode (without stirring), and the distance between the substrates and the counter electrode was about 1.5 cm. The coating sample area was about 5 cm$^2$.

EXAMPLE 3

Materials Characterization

The structure and morphology of the products were examined by field emission scanning electron microscopy (FESEM; JEOL, JSM-6700F, 5 kV). X-ray photoelectron spectroscopy (XPS) was performed using a VG ESCA LAB-220i XL XPS with a monochromatic Al Kα (1486.6 eV) X-ray source. The adventitious carbon C 1s peak at 284.6 eV was used as the charge correction reference.

EXAMPLE 4

Removal of Congo Red

Two pieces of FeOOH coated films were dipped into an aqueous solution of Congo red. After the desired duration, 1 mL of the solution was taken out for analysis by UV-Vis spectroscopy (Shimadzu UV-2450) to determine the concentration of the dye in the solution. The Congo red concentration was obtained by measuring the peak of the Congo red absorbance band at a wavelength of 498 nm, using a linear calibration curve over 10 to 500 mg L$^{-1}$. To estimate the adsorption capacity through adsorption isotherms, the initial concentrations of Congo red were varied in the range of 10 to 500 mg L$^{-1}$. The adsorption capacity $q_e$ can be calculated with the equation:

$$q_e = \frac{(C_0 - C_e)V}{m} \qquad (1)$$

where $C_o$ and $C_e$ are the initial and equilibrium concentrations of Congo red (mg L$^{-1}$), m is the mass of the FeOOH film in grams, and V is the volume of the solution in liters.

Batch kinetic experiments were carried out by adding the coated FeOOH sample to 10 mL of Congo red solution with known initial concentrations and agitated at room temperature for different time intervals. The concentration of Congo red left in the supernatant solution was analyzed as above. All the adsorption experiments were carried out under room temperature without any pH adjustment.

EXAMPLE 5

Results and Discussion for Electrochemical Deposition of FeOOH

Aqueous electrochemical deposition of iron hydroxide is typically achieved by either a cathodic or anodic reaction with the use of nitrate based or acetate based electrolytes, respectively. In using an aqueous approach, the restriction on the pH of the growth solution is that it has to be neutral or only slightly acidic. An alkaline pH causes unwanted precipitation and a highly acidic medium causes etching of the grown film.

Based on these restrictions, the experiments on cathodic growth using nitrate based electrolytes proved to be difficult. The Pourbaix diagram shows that at the selected pH equilibrium, an overly negative potential yields metallic iron plating, while FeOOH is deposited only at more positive potentials. This means that cathodic plating is restricted to only a narrow window of tunable voltages (about 350 mV).

In contrast, anodic deposition using the acetate based electrolyte is ideal as there is only a lower bound in the restriction of the applied voltage. This allows a better control of the electrodeposition current that controls the density and overlap of nuclei centers, thereby affecting the type of structures formed. In addition, the use of acetate provides a carboxyl group that is reported to introduce a coordination effect that favors the formation of rod-like structures. These make the acetate based electrodeposition suitable for coating the porous film desirable for water treatment.

Despite the advantages, the detailed mechanism of anodic growth of a porous film using $(NH_4)_2Fe(SO_4)_2$ and $CH_3COONa$ is not well reported. It was believed that $Fe^{3+}$ is formed by the electrochemical oxidation of $Fe^{2+}$ ions precipitated from $CH_3COO^-$ hydrolyzation. The $Fe^{3+}$ then readily formed FeOOH with the hydroxyl ions. The reactions at the anode can be described as follows,

$$Fe^{2+} - e^- \rightarrow Fe^{3+} \quad (2)$$

$$Fe^{3+} + 3OH^- \rightarrow FeOOH + H_2O \quad (3)$$

The parameters of the electrodeposition were tuned to optimize uniformity and adhesion. These two properties were important for kinetics study and immobilization, respectively. For uniformity, the inventors reported that a constant current growth approach was undesirable. This was attributed to the non-uniform distribution of the electric field across the substrate driven by the need to maintain a constant current.

This was why thicker growths were normally observed on the edges of a planar ITO due to the enhanced fields at the edges. A constant potential method, in contrast, gave good controllability and uniformity.

The inventors reported that adhesion of the coated film was typically improved when the deposition rate was kept low. A fast deposition rate increased the homogenous precipitation reaction at the electrode whereby poorly bonded unwanted particles were formed on the substrate. The higher growth rate also tended to yield larger structures that were again detrimental to adhesion and uniformity.

Figure 1B:
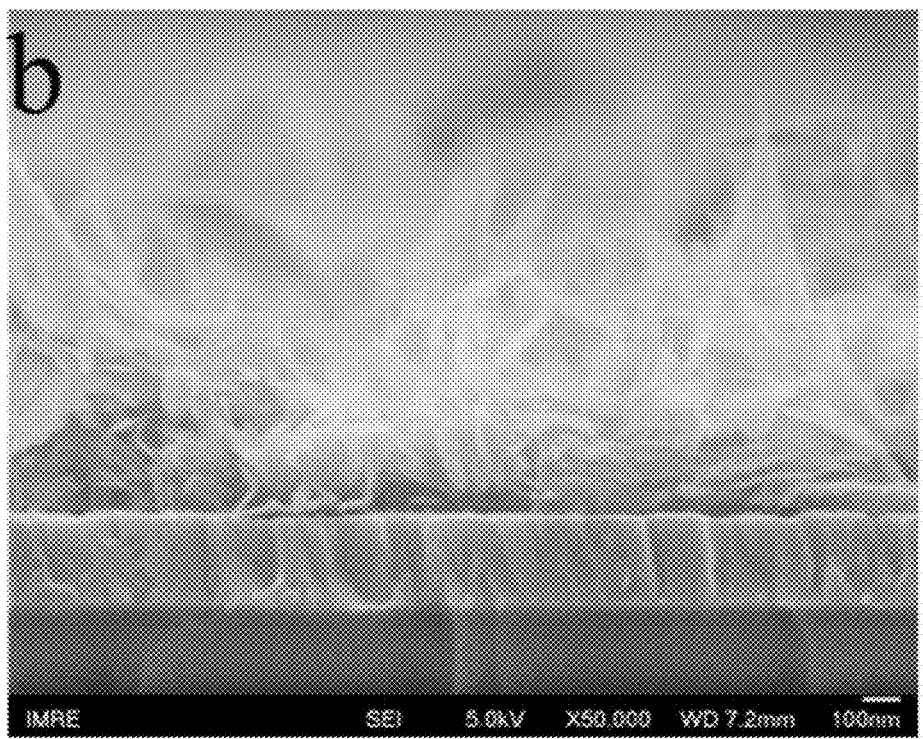
FIG. 1B is a scanning electron microscopy (SEM) image of a cross-section of a FeOOH film deposited with 0.5 M $(NH_4)_2Fe(SO_4)_2$ and 1 M $CH_3COONa$ under a high growth rate according to an embodiment. Large and flaky structures with poor adhesion and uniformity were observed. Scale bar represents 100 nm.

A typical example of a poorly adhered film achieved under a high growth rate is shown in FIG. 1A and FIG. 1B. A combination of parameters may be tuned to affect the growth rate and the type of films coated. A higher electrolyte concentration tended to increase the growth rate due to enhanced diffusion. A higher voltage generally yielded a higher current and hence a higher growth rate. In the present setup, the minimum voltage that was used to trigger the electrochemical reaction was about 0.3 V (vs. Ag/AgCl), and a lower potential did not result in the electrodeposition of films in the experiments carried out.

Figure 2A:
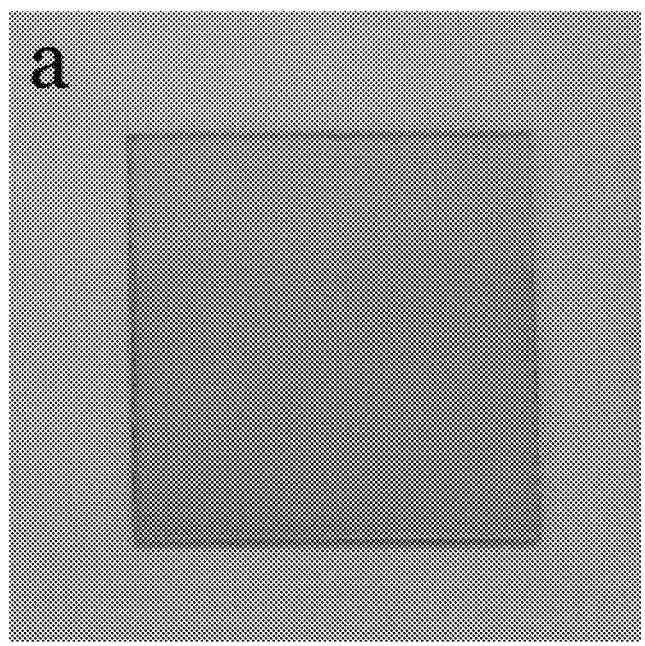
FIG. 2A is a photograph of FeOOH film deposited on indium tin oxide (ITO) under an optimized condition according to an embodiment showing good uniformity.
Figure 2B:
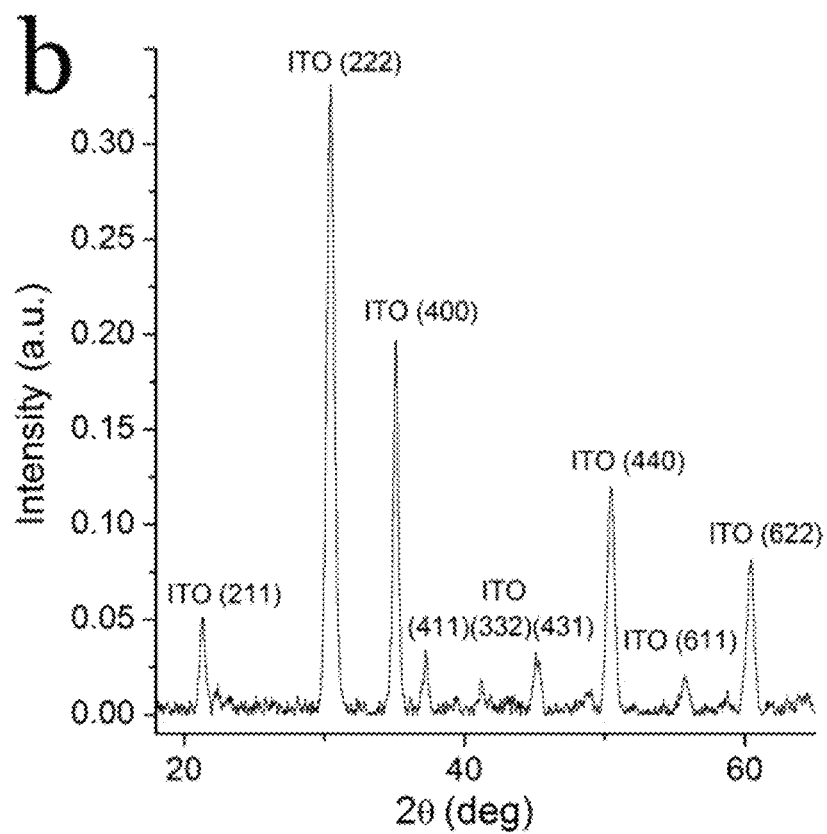
FIG. 2B is a graph showing X-ray diffraction (XRD) spectrum of a coated FeOOH on ITO according to an embodiment. Only diffraction peaks of ITO were observed showing the amorphous nature of the film.

In balancing adhesion, uniformity and reasonable growth rates, the inventors reported optimized growth conditions using 0.1 M $(NH_4)_2Fe(SO_4)_2$ and 0.2 M $CH_3COONa$ at 0.5 V against a Ag/AgCl electrode. This yielded films with decent adhesion and good uniformity as shown in FIG. 2A, while the X-ray diffraction analysis shown in FIG. 2B yielded only the substrate diffraction peaks, thereby indicating the amorphous nature of the coated film.

Figure 3A:
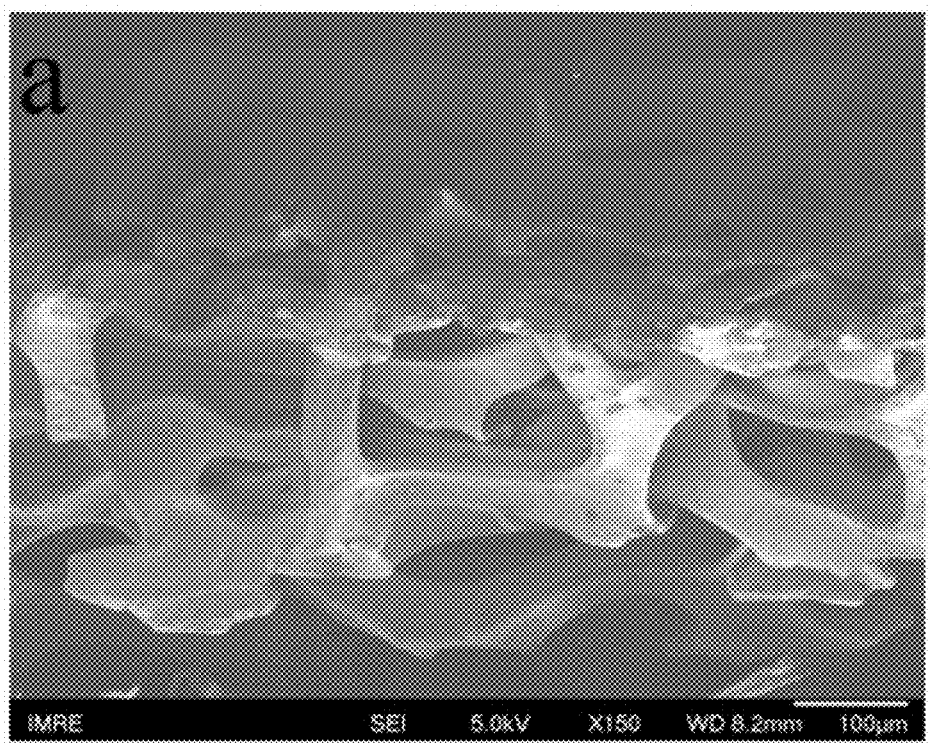
FIG. 3A is a SEM image of the electrodeposited FeOOH films on nickel (Ni) foam substrate with low magnification according to an embodiment. The image shows the growth of porous structures on the surface of the Ni foam. Scale bar represents 100 µm.
Figure 3B:
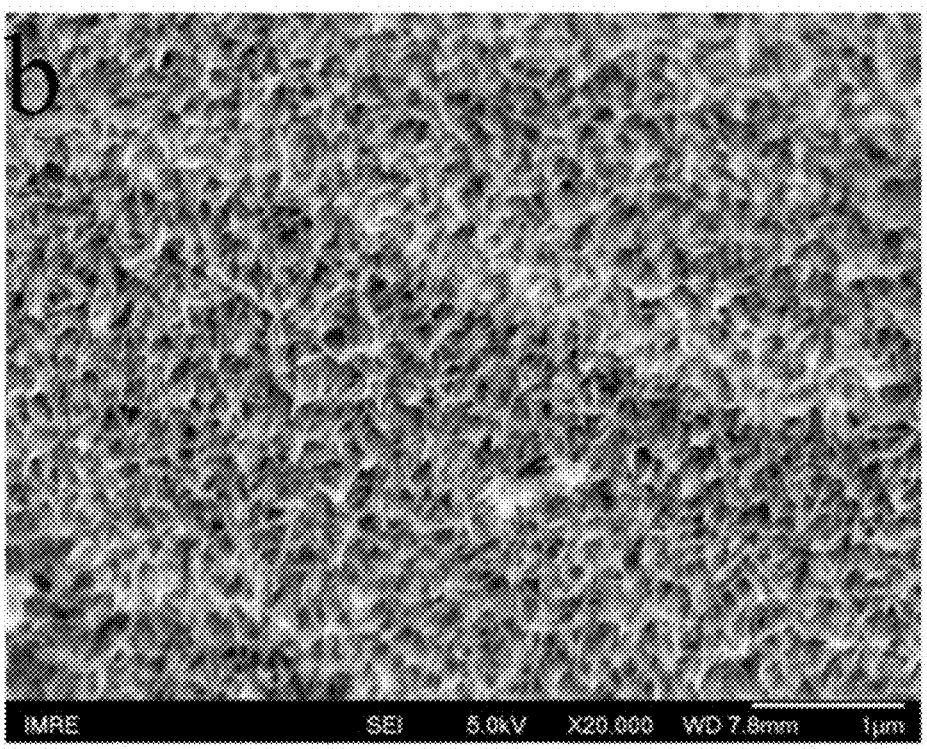
FIG. 3B is a SEM image of the electrodeposited FeOOH films on Ni foam substrate with high magnification according to an embodiment. The image shows the growth of porous structures on the surface of the Ni foam. Scale bar represents 1 µm.

Studies to achieve good uniformity and adhesion on a flat surface were carried out prior to deposition on more complicated substrates, such as porous Ni foam, to prevent unwanted homogenous precipitation or blockage that may greatly affect the subsequent coating or adsorption process. The SEM images of the coated FeOOH film on the Ni foam in FIG. 3A and FIG. 3B showed no such blockage and the successful reproduction of the porous film on the foam surface.

Figure 4A:
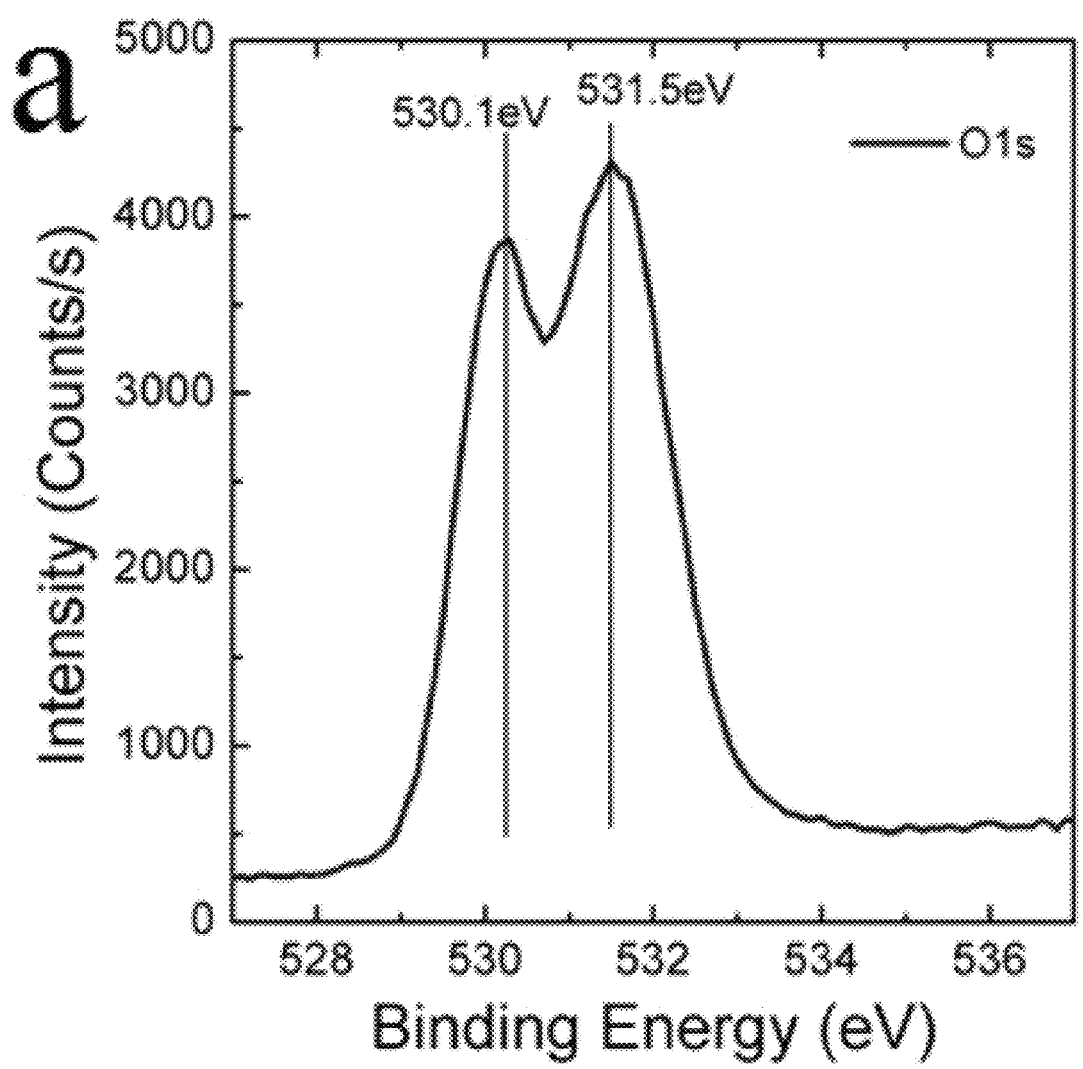
FIG. 4A is a graph showing X-ray photoelectron spectra (XPS) of O 1s of the FeOOH film deposited on ITO according to an embodiment. The binding energy for O 1s was consistent with the presence of FeOOH.
Figure 4B:
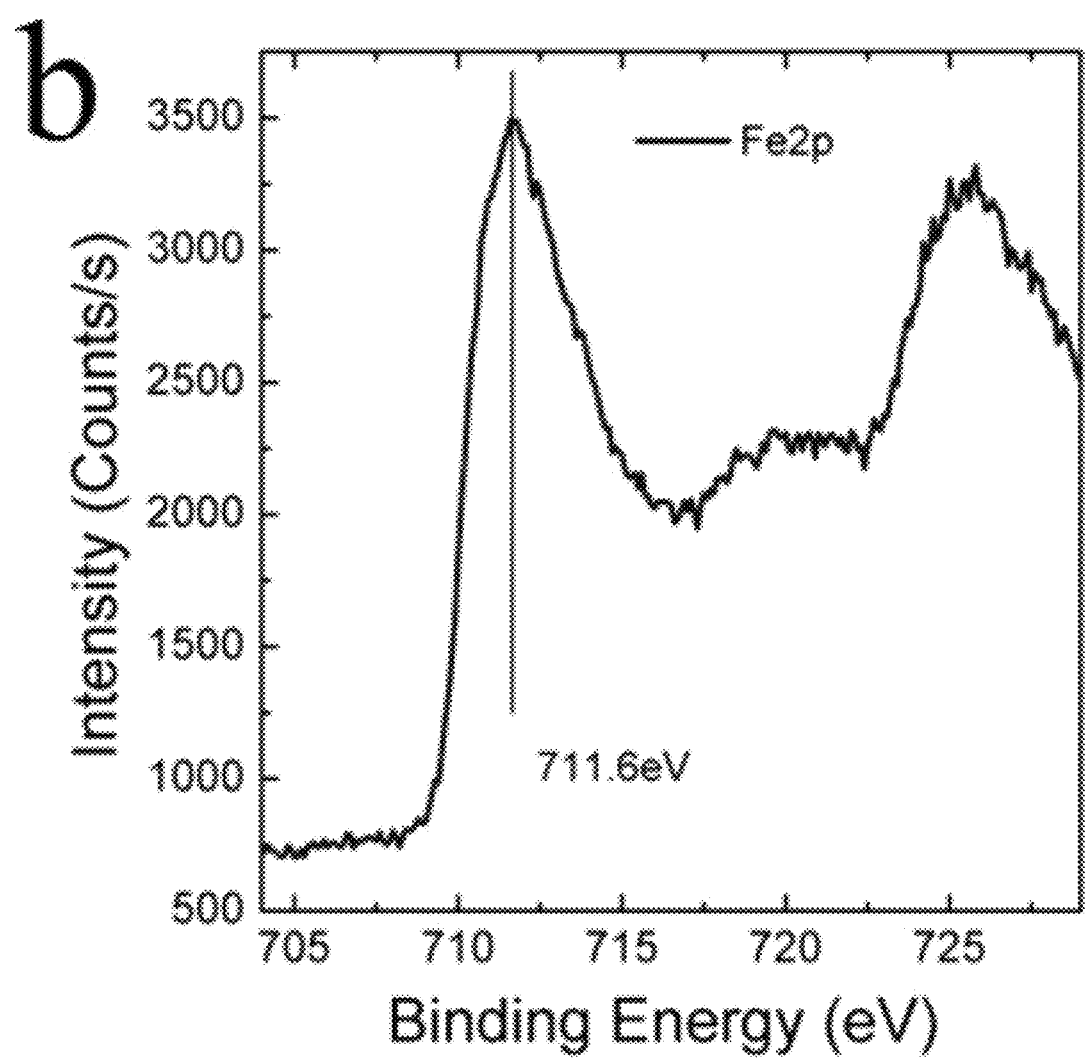
FIG. 4B is a graph showing X-ray photoelectron spectra of Fe 2p of the FeOOH film deposited on ITO according to an embodiment. The binding energy for Fe 2p was consistent with the presence of FeOOH.

The chemical nature of the coated film was characterized using XPS. The O 1s core level spectrum in FIG. 4A showed the presence of both Fe—O and Fe'3OH peaks expected at 530.1 eV and 531.5 eV, respectively. The Fe 2p core level binding energy spectrum in FIG. 4B showed a Fe $2p_{3/2}$ peak at 711.6 eV. These were consistent with the expected binding energies reported for FeOOH.

EXAMPLE 6

Adsorption Performance of Coated FeOOH

The adsorption performance of the coated FeOOH films on porous Ni foam substrates for the Congo red dye pollutant was examined. The Congo red adsorption capacities were measured for a control sample (bare Ni foam) and for different coated film thicknesses.

Figure 5A:
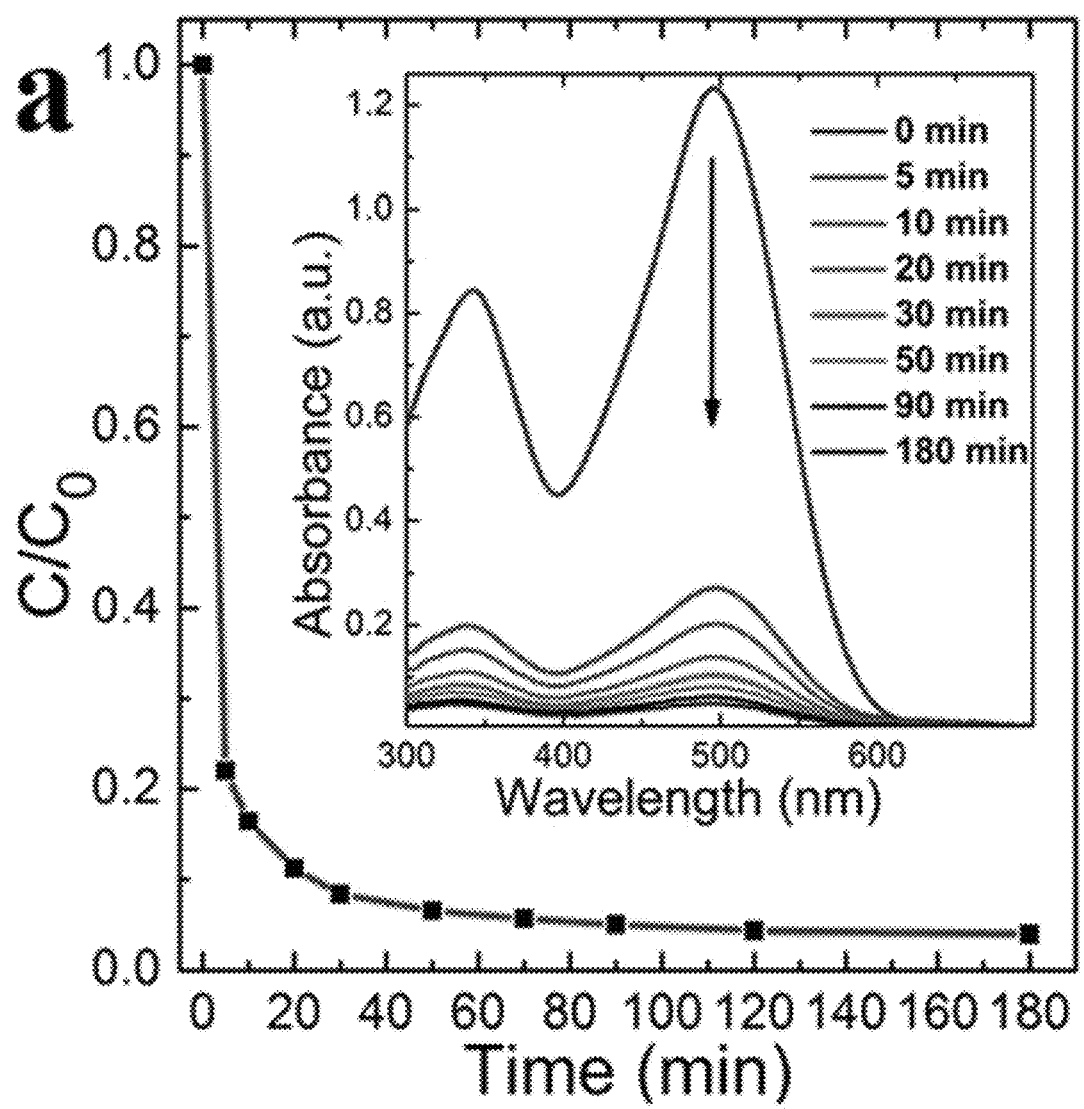
FIG. 5A is a graph showing adsorption rate of Congo red on the FeOOH film according to an embodiment. The inset shows the absorption spectra of Congo red solutions after being treated by using the coated FeOOH film at the different indicated times. $C_0$ (mg L$^{-1}$) is the initial concentration of the Congo red at 20 mg L$^{-1}$ and C (mg L$^{-1}$) is the concentration of the solution at different time intervals during the adsorption.

FIG. 5A shows the normalized concentrations for a 20 mg $L^{-1}$ of Congo red solution after being treated with coated FeOOH samples at different time intervals. The inset shows the evolution of the absorbance peak of the Congo red that remains unchanged throughout the adsorption experiment.

Figure 6A:
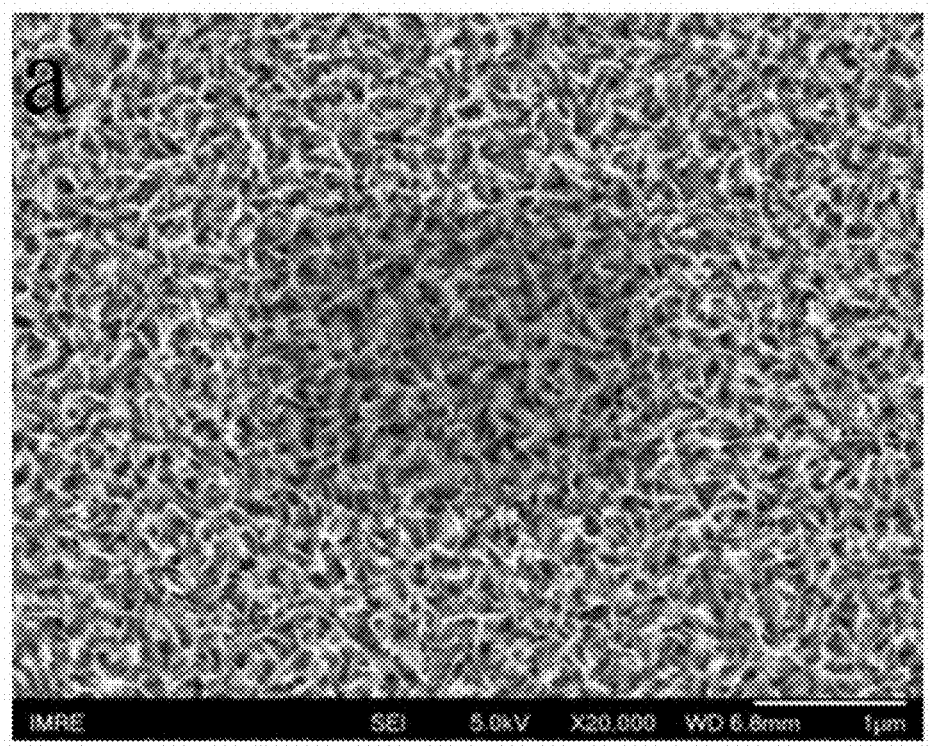
FIG. 6A is a SEM image of FeOOH film before adsorption of Congo red according to an embodiment. Scale bar represents 1 μm.
Figure 6B:
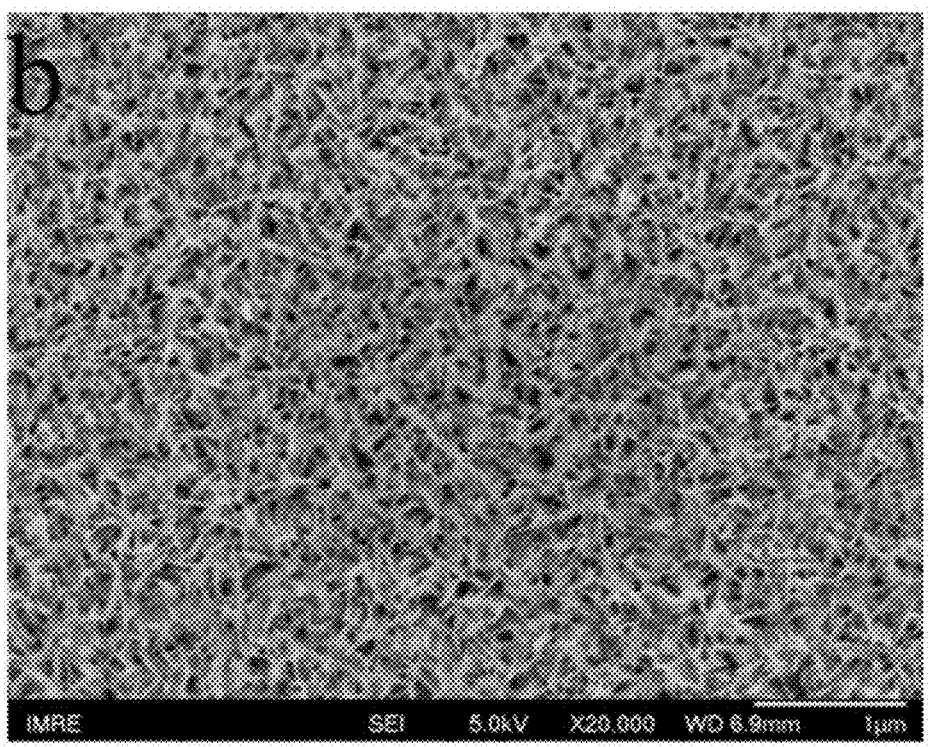
FIG. 6B is a SEM image of the FeOOH film according to the embodiment shown in FIG. 6A after the adsorption of Congo red. Scale bar represents 1 μm. The image shows similar morphology to that of FIG. 6A, indicating the absence of major structural change.

The identical adsorption peak position indicates clearly that any absorbance decrease can be attributed to the removal of the dye from the solution, and not from any spurious effect involving dye degradation. Thereafter, the absorption was subsequently monitored at 498 nm to quantify the dye adsorbent properties of the FeOOH film. The inventors have also ascertained from SEM images shown in FIG. 6A and FIG. 6B, that the coated film demonstrated no morphology changes after the adsorption, indicating the stability of the film in the Congo red solution.

Figure 5B:
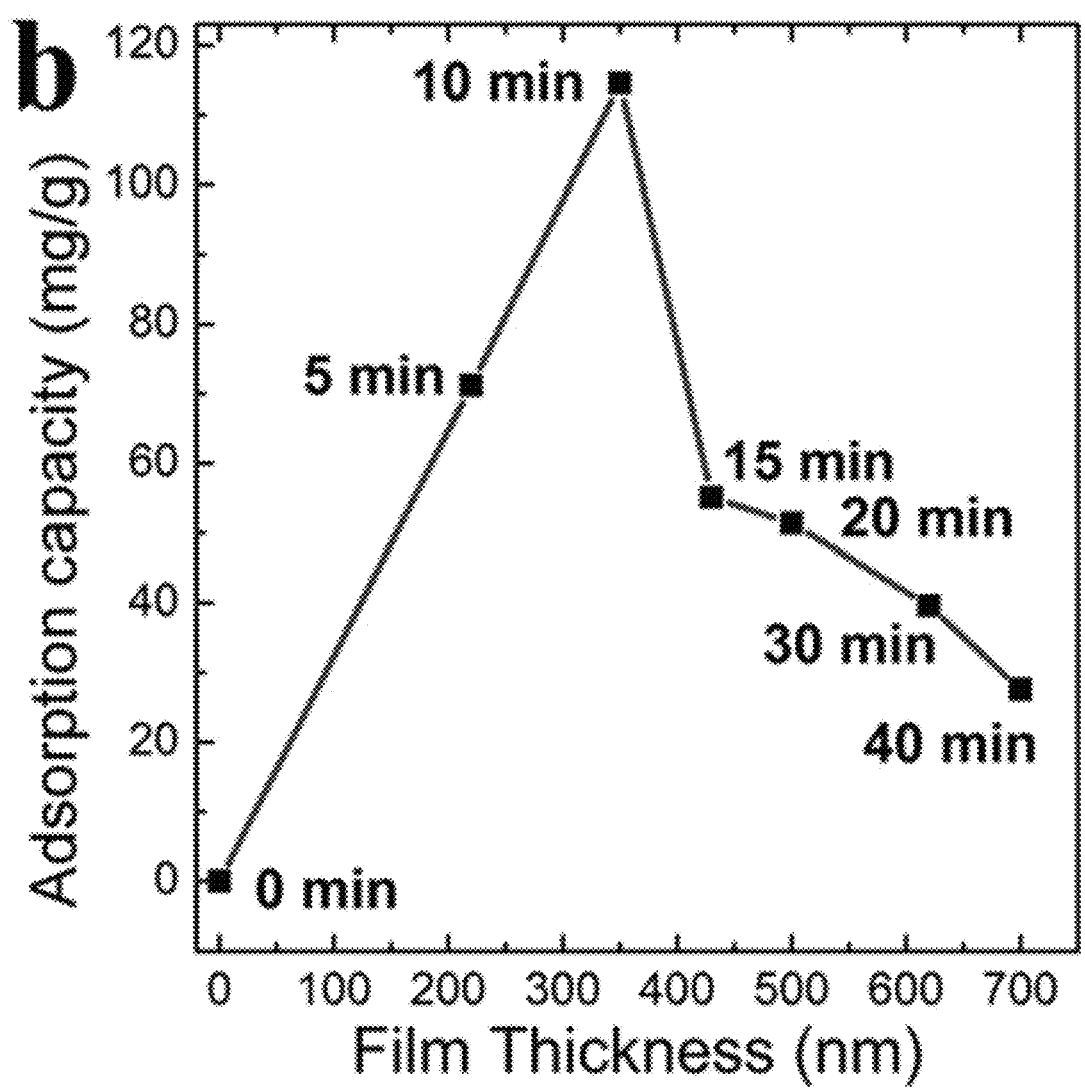
FIG. 5B is a graph showing measured adsorption capacities versus film thickness obtained by different deposition durations (0, 5, 10, 15, 20, 30, 40 minutes) according to embodiments.

The best performing coated film was able to remove more than 92% of the Congo red without any additives, within 30 minutes at room temperature. This increases to more than 96% after 180 minutes. The adsorption capacities of the coated films with different thicknesses are shown in FIG. 5B. It can be seen that the highest capacity obtained is for a film thickness of about 300 nm which gave a capacity of 115 mg $g^{-1}$ at a dye concentration of 50 mg $L^{-1}$.

As will be shown subsequently, the same deposition conditions can yield a maximum capacity of 144 mg $g^{-1}$ from isotherm studies. The typical capacity values obtained for iron oxide/hydroxide nanoparticles when compared to the obtained values were summarized in TABLE 1.

TABLE 1

Comparison of Congo red adsorption properties of various iron oxide/hydroxide nanostructures

| Adsorbents | $q_m$ (mg/g) | References | Year |
|---|---|---|---|
| Coated porous FeOOH thin film | 144 | This work | 2015 |
| Coated FeOOH rods | 41 | This work | 2015 |
| Conventional FeOOH | 32 | 18 | 2013 |
| Commercial α-Fe$_2$O$_3$ | 42 | 35 | 2014 |
| α-FeOOH hierarchical nanostructure by self-assembly | 56 | 18 | 2013 |
| Urchin-like α-FeOOH hollow spheres | 275 | 16 | 2012 |
| α-FeOOH hierarchical nanostructure | 239 | 17 | 2011 |
| Mesoporous Fe2O3 | 53 | 34 | 2008 |
| γ-Fe2O3 hierarchical nanostructure | 58 | 18 | 2013 |
| α-Fe$_2$O$_3$ hierarchical nanostructure | 66 | 17 | 2011 |
| Hollow nestlike α-Fe$_2$O$_3$ | 160 | 29 | 2012 |
| α-Fe$_2$O$_3$ nanoparticles | 154 | 35 | 2014 |
| α-Fe$_2$O$_3$ hollow spheres | 195 | 31 | 2013 |

It was noted that the commercially used iron oxide/hydroxide nanoparticles for water treatment reportedly gave a maximum capacity of 32 mg g$^{-1}$, while the highest reported capacity in the literature was for urchin-like FeOOH hollow nanospheres at 275 mg g$^{-1}$.

It was important to put the presently reported capacity in context. The inventors' work was carried out on a room temperature coated film on a physical substrate that did not involve nanoparticle suspension. This means that when the dye was adsorbed onto the coatings, it was effectively immobilized on the rigid substrate and can be easily removed without filtering. The lower capacities of commercial materials can be attributed to the granulation process that was required for removing any adsorption materials after use. Therefore, the capacities were typically much lower than the achievable pre-granulation capacity reported in the literature. As the presently disclosed immobilization approach did not require any filtering process, it can be used as grown and therefore represented an extremely high practical capacity.

Figure 7:
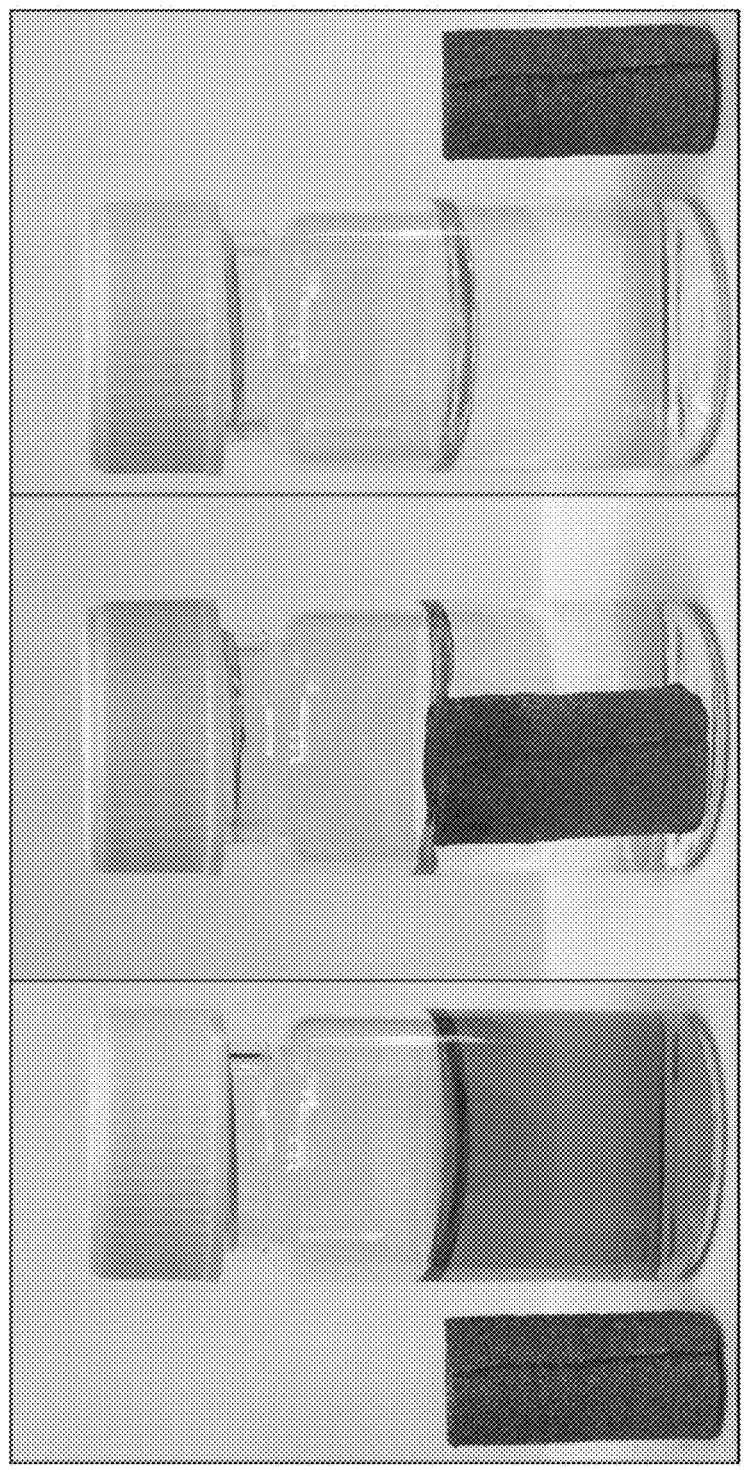
FIG. 7 shows images of 10 mL of 20 mg/L Congo red solution (left), the solution after 180 minutes immersion of coated FeOOH on Ni foam (middle), and the solution after removal of coated film and contaminants (right) according to an embodiment. The process above demonstrated easy immobilization and removal of dye pollutant.
Figure 8A:
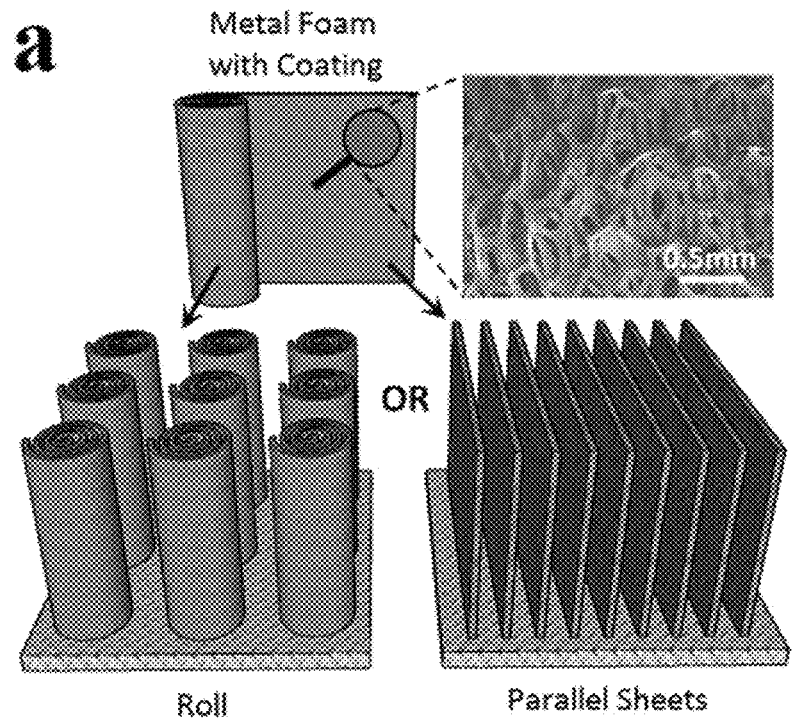
FIG. 8A shows two examples of how thin porous films may be integrated into adsorbent devices, in the form of rolls or parallel sheets.
Figure 8B:
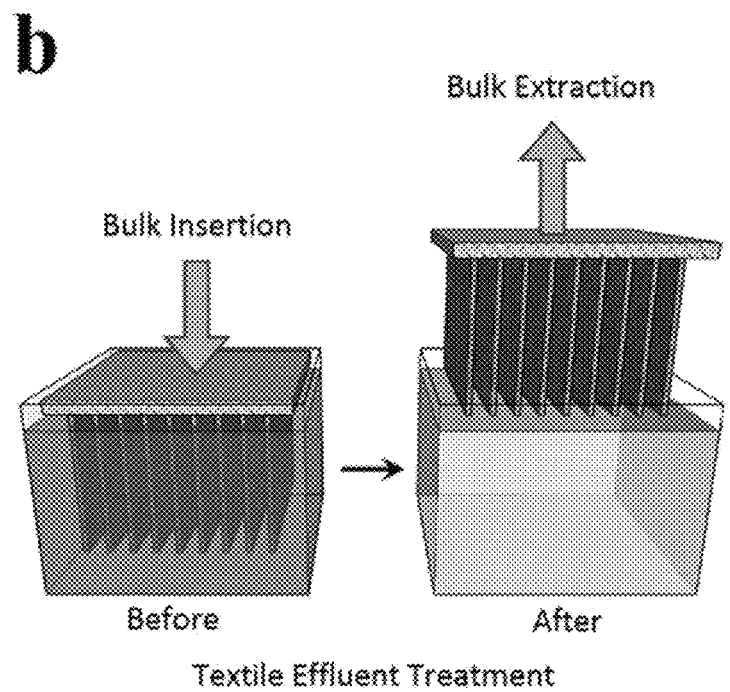
FIG. 8B shows use of such devices in a bulk insertion and bulk extraction process in water treatment for easy separation.

An example in the ease of removing the adsorption material before and after immobilization of the Congo red dye is shown in FIG. 7. Achieving such a high practical capacity showed the viability of such an approach and this unprecedented demonstration will potentially open up a whole range of possibilities in the development of materials and methods for adsorption technologies in water treatment. For example, FIG. 8A shows two schematics depicting how such coated layers can be rolled or stacked to increase the amount of materials per unit volume. Such structures can be easily inserted and extracted in a bulk dipping process in water treatment as shown in FIG. 8B.

Since the present approach is a room temperature technique, conducting fiber/polymers can be used as the rigid substrates and this will be important in the design and integration of such technologies into the current treatment processes.

Figure 9:
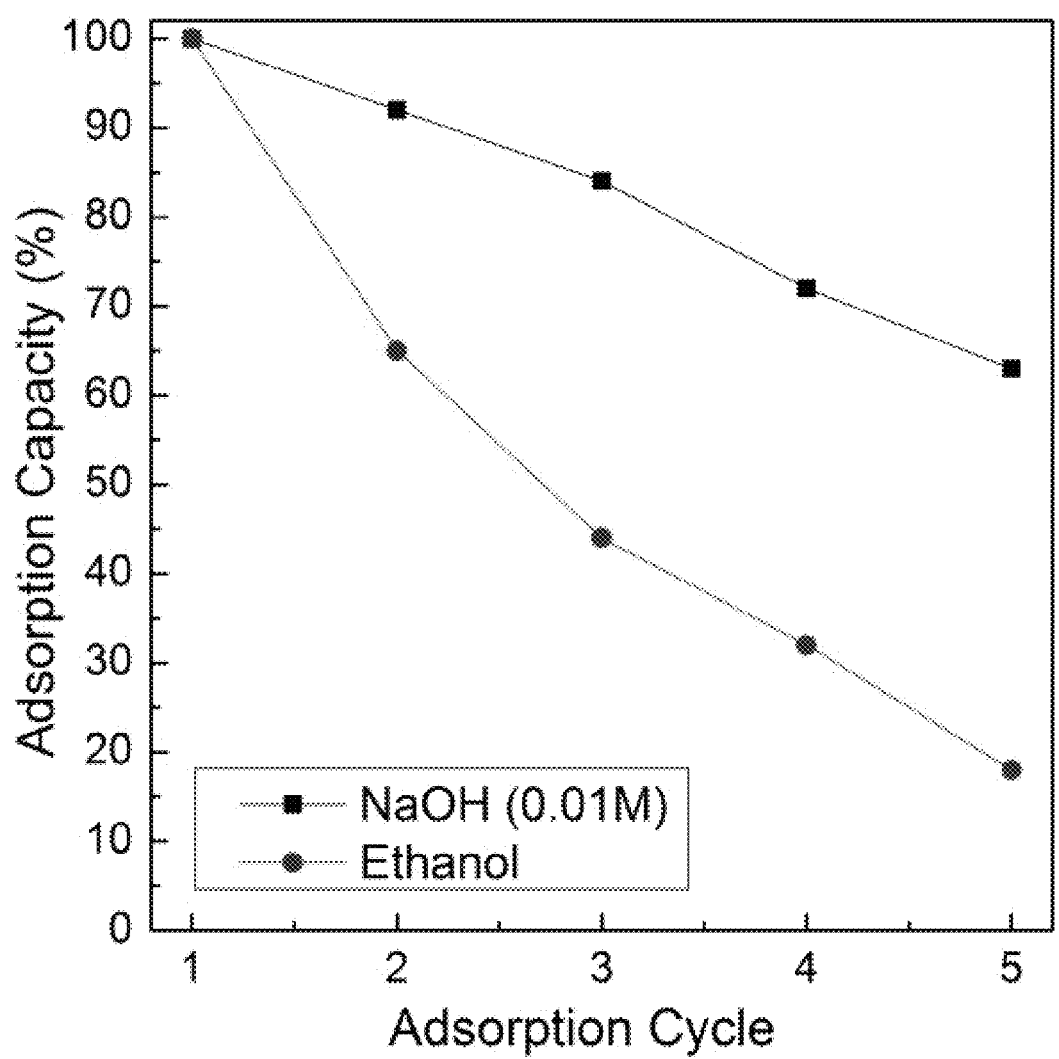
FIG. 9 is a graph depicting relative adsorption capacity of the coated FeOOH with respect to the initial adsorption for 5 cycles of adsorption and desorption process according to an embodiment. The desorption process was accomplished by a 1 hour soaking in the indicated solutions. The inventors found that each cycle of adsorption achieved on average 88.9% and 65.1% of the previous adsorption capacity in sodium hydroxide (NaOH) solution and ethanol, respectively.

The inventors also evaluated the recycling efficiency of the coated FeOOH sample by subjecting it to five cycles of adsorption and desorption process. In the adsorption process, the samples were loaded via 3 hours of soaking in 500 mg L$^{-1}$ of concentrated Congo red solution. The desorption of Congo red was achieved by immersing the samples in either ethanol or 0.01 M NaOH solutions for 1 hour. The relative adsorption capacity with respect to the initial adsorption capacity was monitored and shown in FIG. 9.

On average, the coated FeOOH was able to retain 88.9% of its adsorption capacity after each regeneration cycle in NaOH solution, while it retained 65.1% of its adsorption capacity if ethanol was used. The regeneration efficiency is comparable with reported values for iron oxide/hydroxide nanoparticles. This showed that the coated thin films did not adversely affect their regeneration ability, and suggested that dilute NaOH solution provides better desorption performance.

EXAMPLE 7

Adsorption Mechanism of FeOOH

Figure 10A:
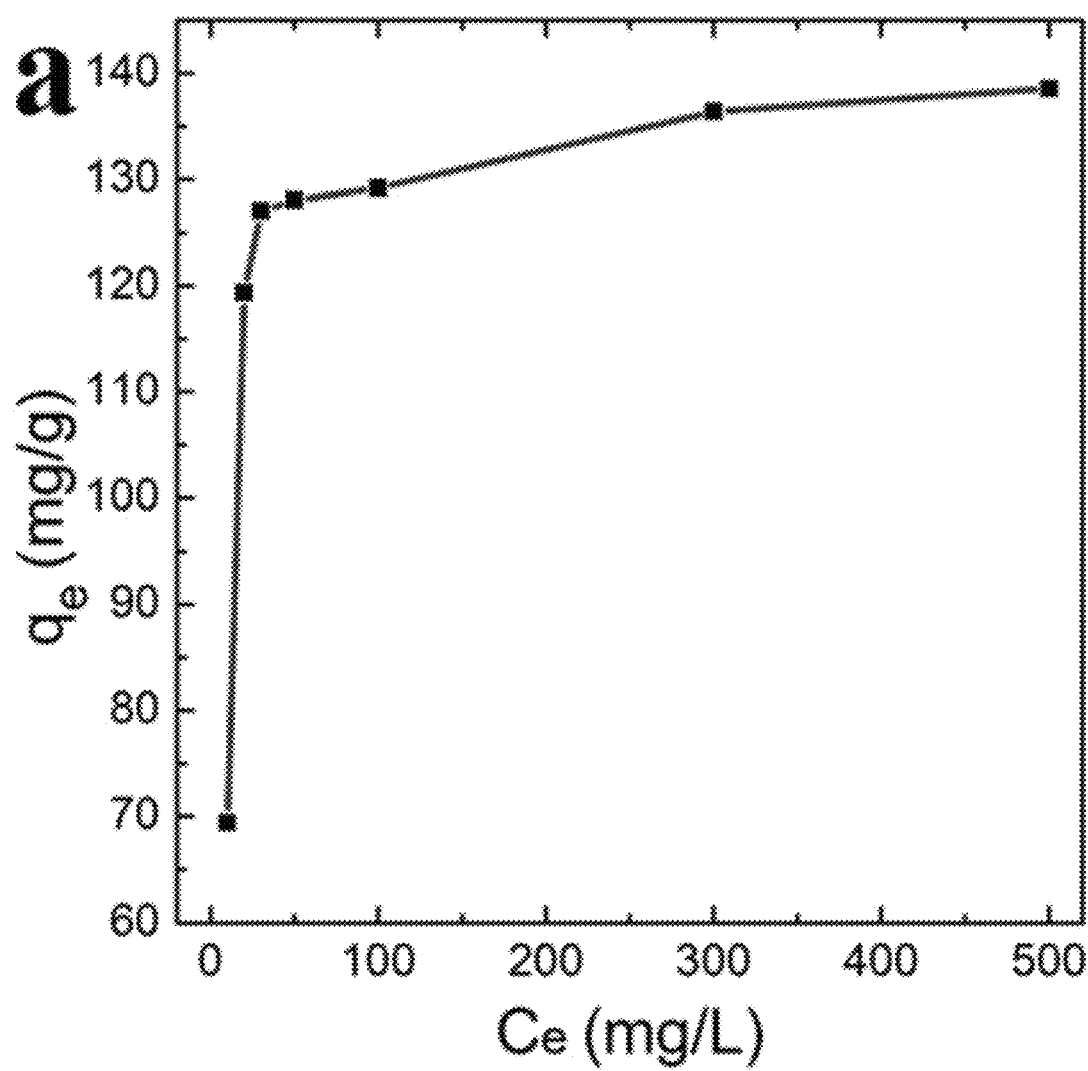
FIG. 10A is a graph showing adsorption isotherm of capacity ($q_e$) versus pollutant concentration ($C_e$) of an about 300 nm porous FeOOH coated film for Congo red adsorption according to an embodiment.

It was important to understand the mechanism and kinetics of pollutant adsorption on FeOOH. The inventors first studied the interaction behavior between the adsorbent and the pollutant by investigating the adsorption isotherms at different initial Congo red concentrations, as shown in FIG. 10A. The obtained equilibrium adsorption data can be analyzed by fitting against the Langmuir and Freundlich isotherm models, $$\frac{C_e}{q_e} = \frac{1}{bq_m} + \frac{C_e}{q_m} \quad (4)$$

$$\log q_e = \log K_f + \frac{1}{n}\log C_e \quad (5)$$

where constant b is related to the energy of adsorption (L mg$^{-1}$), $q_m$ is the Langmuir maximum adsorption capacity (mg g$^{-1}$), $C_e$ (mg L$^{-1}$) is the equilibrium solute concentration, $K_f$ is roughly an indicator of the adsorption capacity and 1/n is the adsorption intensity.

The Freundlich model basically assumed multilayer and non-ideal adsorption with non-uniformly distributed sorption sites of different affinities. The Langmuir isotherm in contrast, was based on an ideal monolayer and homogenized coverage on the adsorbent surface, where all sorption sites were identical and energetically equivalent.

Figure 10B:
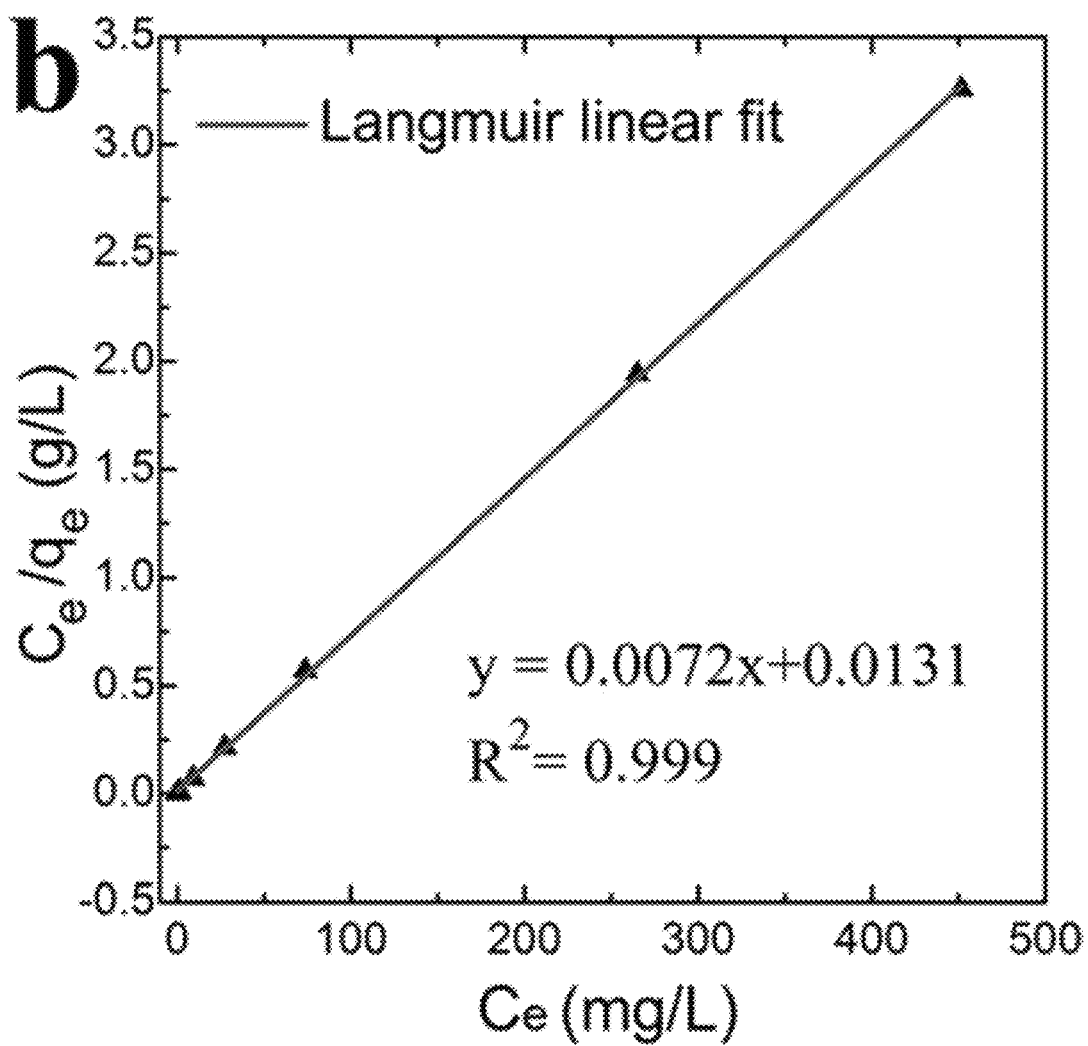
FIG. 10B is a graph showing plot of $C_e/q_e$ versus $C_e$ for fitting via the Langmuir isotherm adsorption model. The linear fit shows that the pollutants are bonded to surface active sites.
Figure 11:
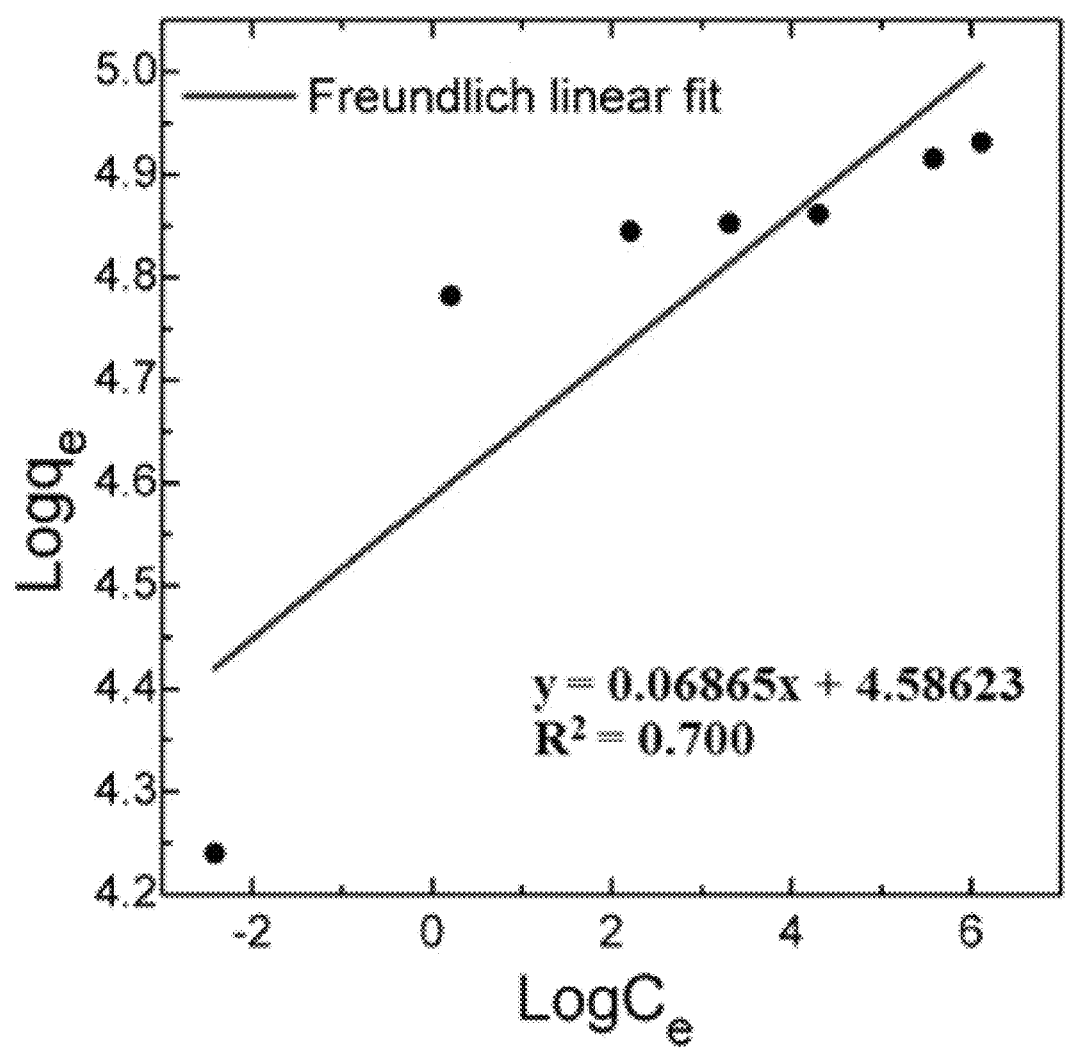
FIG. 11 is a graph showing linearized Freundlich isothermal plots of Congo red adsorption on FeOOH film. A poor correlation coefficient of 0.7 was obtained showing a lack of multilayer adsorption.

The fitting using the Langmuir adsorption model was shown in FIG. 10B. An excellent fit was obtained with a correlation coefficient ($R^2$) value of 0.999. The fitting using the Freundlich isotherm was shown in FIG. 11 where a low $R^2$ value of 0.700 was obtained. The inventors thus concluded that the Langmuir model described the adsorption of Congo red on FeOOH well. This showed that the dye removal was governed by a surface limited process. The good fit also showed that very little solid bulk diffusion of the pollutant into FeOOH may be expected. This was consistent with the adsorption mechanism of metal oxide/hydroxides.

It was then important to ascertain if the surface adsorption was a chemisorption process since a physisorption bonding lacked the stability required in the dye immobilization treatment. This can be examined by investigating the time dependence in the amount of adsorbed pollutants and the equilibrium capacities of the material at different pollutant concentrations. This was because the type of adsorption governs the kinetics that can be described using either a linearized form of the pseudo-first order (physisorption) or pseudo-second-order (chemisorption) models. The governing kinetic equations can be presented as follows, $$\log(q_e - q_t) = \log q_e - \frac{k_1 t}{2.303} \qquad (6)$$

$$\frac{t}{q_t} = \frac{1}{k_2 q_e^2} + \frac{1}{q_e} t \qquad (7)$$

where $q_t$ (mg g$^{-1}$) is the amount of Congo red adsorbed on the surface of the adsorbent at time t and $q_e$ (mg g$^{-1}$) is the equilibrium adsorption capacity. $k_1$ (min$^{-1}$) and $k_2$ (g mg$^{-1}$min$^{-1}$) are the rate constants of pseudo-first-order and the pseudo second-order model of adsorption, respectively.

Figure 12A:
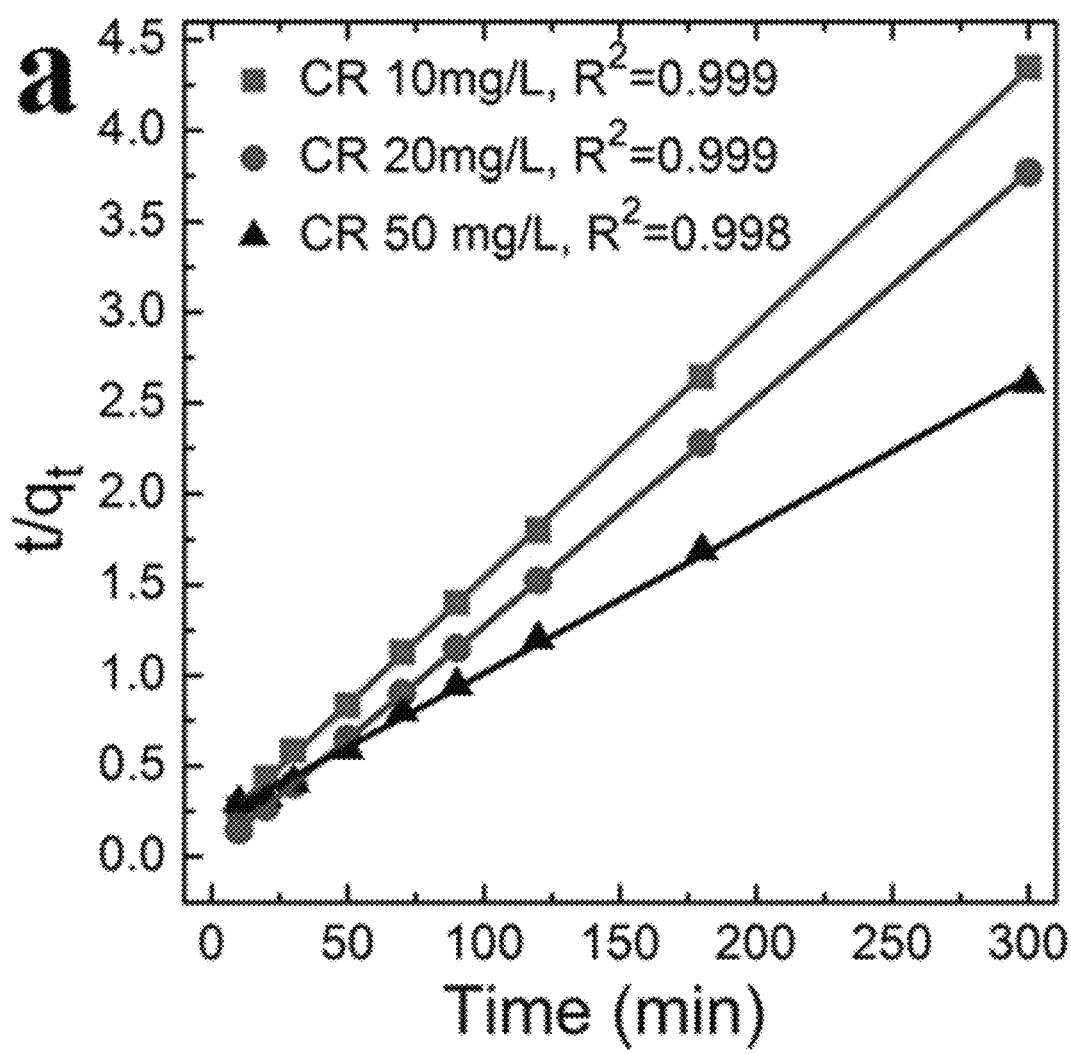
FIG. 12A is a graph showing linearized pseudo-second-order kinetic plots of Congo red adsorption for FeOOH deposited on Ni foam according to an embodiment.
Figure 13:
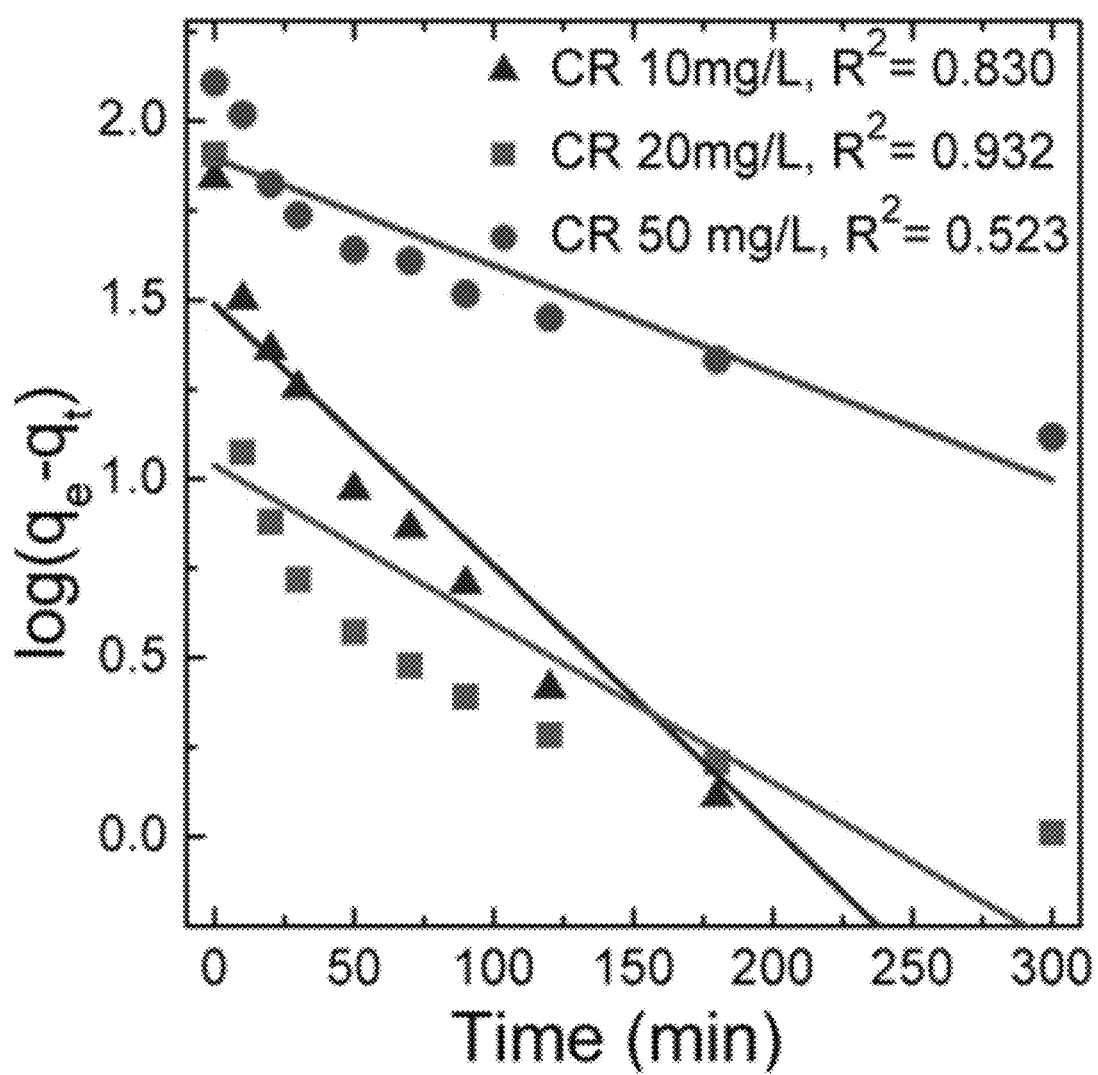
FIG. 13 is a graph showing linearized pseudo-first-order kinetics plots of Congo red adsorption for FeOOH deposited on Ni foam according to an embodiment. Poor correlations were obtained for all different Congo red concentrations. The correlation coefficient for each concentration is indicated in the plot.

FIG. 12A shows an excellent fit using the pseudo-second-order model with fitting correlation coefficient (R$^2$) values of close to 0.999 for all Congo red concentrations. In contrast, the fit with the pseudo-first-order model is poor with R$^2$ values as low as 0.523 as shown in FIG. 13. A summary of the respective correlation coefficients for the fits is shown in TABLE 2.

TABLE 2

Kinetic parameters and correlation coefficients calculated from pseudo-secondorder model for adsorption of Congo red on FeOOH film

| Congo red concentration (mg L$^{-1}$) | $q_{e,exp}$ (mg g$^{-1}$) | $q_{e,cal}$ (mg g$^{-1}$) | $k^2$ (g mg$^{-1}$ min$^{-1}$) | R$^2$ |
|---|---|---|---|---|
| 10 | 70.351 | 71.582 | 1.789 × 10$^{-3}$ | 0.999 |
| 20 | 82.637 | 84.034 | 6.316 × 10$^{-4}$ | 0.999 |
| 50 | 128.079 | 123.001 | 3.332 × 10$^{-4}$ | 0.998 |

It can therefore be concluded that the fundamental adsorption mechanism for coated FeOOH is based on a chemisorption process for dyes like Congo red. A recent study was concluded similarly, a chemisorption mechanism for the cationic Rhodamine B dye amid a relatively low adsorption capacity of 8.59 mg g$^{-1}$. The present work showed that the chemisorption mechanism of FeOOH can therefore be applicable for both anionic and cationic dyes, but the presently achieved high capacity shows a clear propensity of FeOOH surfaces towards anionic dye adsorption. In addition, since the kinetics were governed only by the number of surface active sites, bulk diffusion kinetics that were usually slower did not play a role. A fast removal rate of the pollutant was therefore an interesting possibility with the coated FeOOH if a sufficient surface area can be exposed.

Figure 12B:
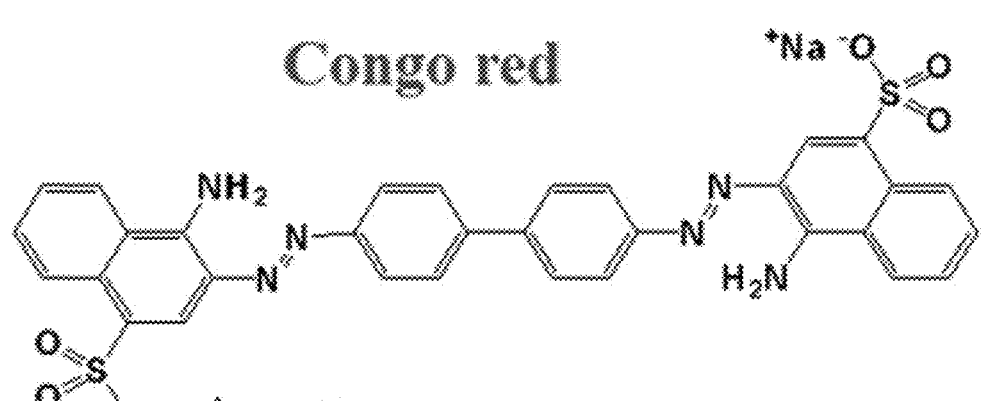
FIG. 12B shows molecular structure of Congo red with the sulfonic groups and its three possible bonding mechanisms with iron hydroxide surfaces in a chemisorption process.
Figure 12B:
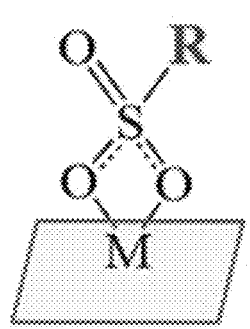
Figure 12B:
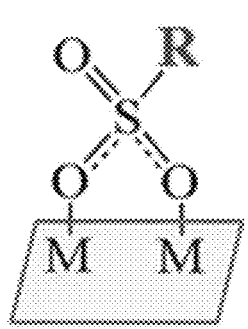
Figure 12B:
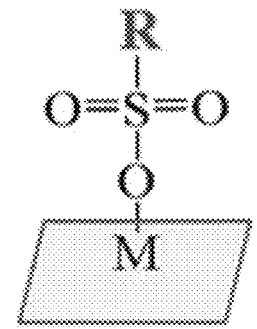

The chemisorption process may be further understood by examining the chemical bonding between the dye and FeOOH in detail. A molecular diagram of Congo red is shown in FIG. 12B where its sulfonic (—SO$_3^-$) bond represents its most reactive component. Chemical bond formation with the surface could occur through complexation via (a) chelating bidentate, (b) bridging bidentate or (c) unidentate bonding with Fe through oxygen, as shown in the schematic in FIG. 12B. As a coated thin film was used, it was relatively simple for the inventors to examine the chemical properties using XPS.

Figure 14A:
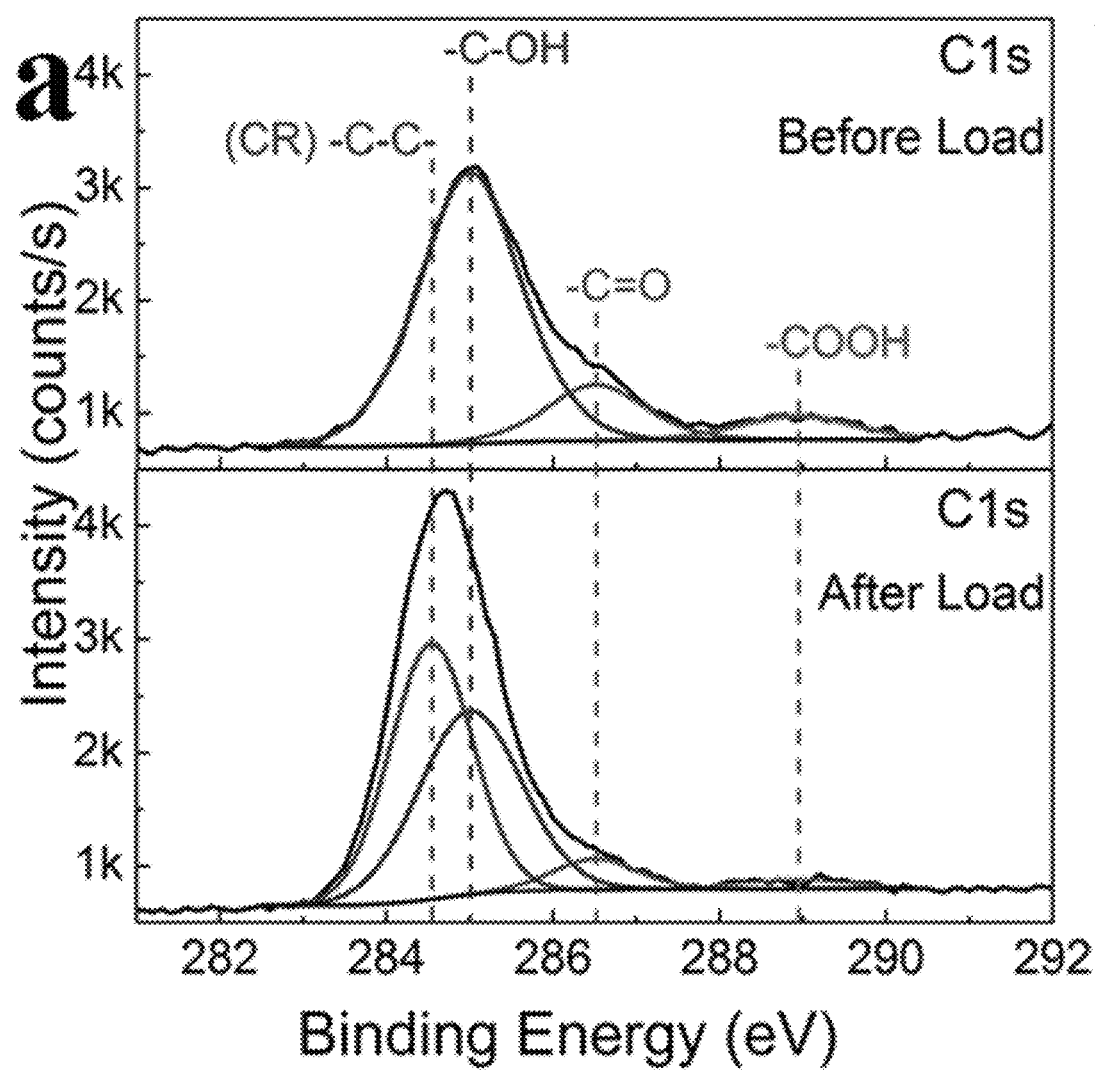
FIG. 14A shows XPS O 1s spectra of the FeOOH thin film before and after Congo red loading according to an embodiment. The presence of adsorbed Congo red can be seen after the bonding.
Figure 14B:
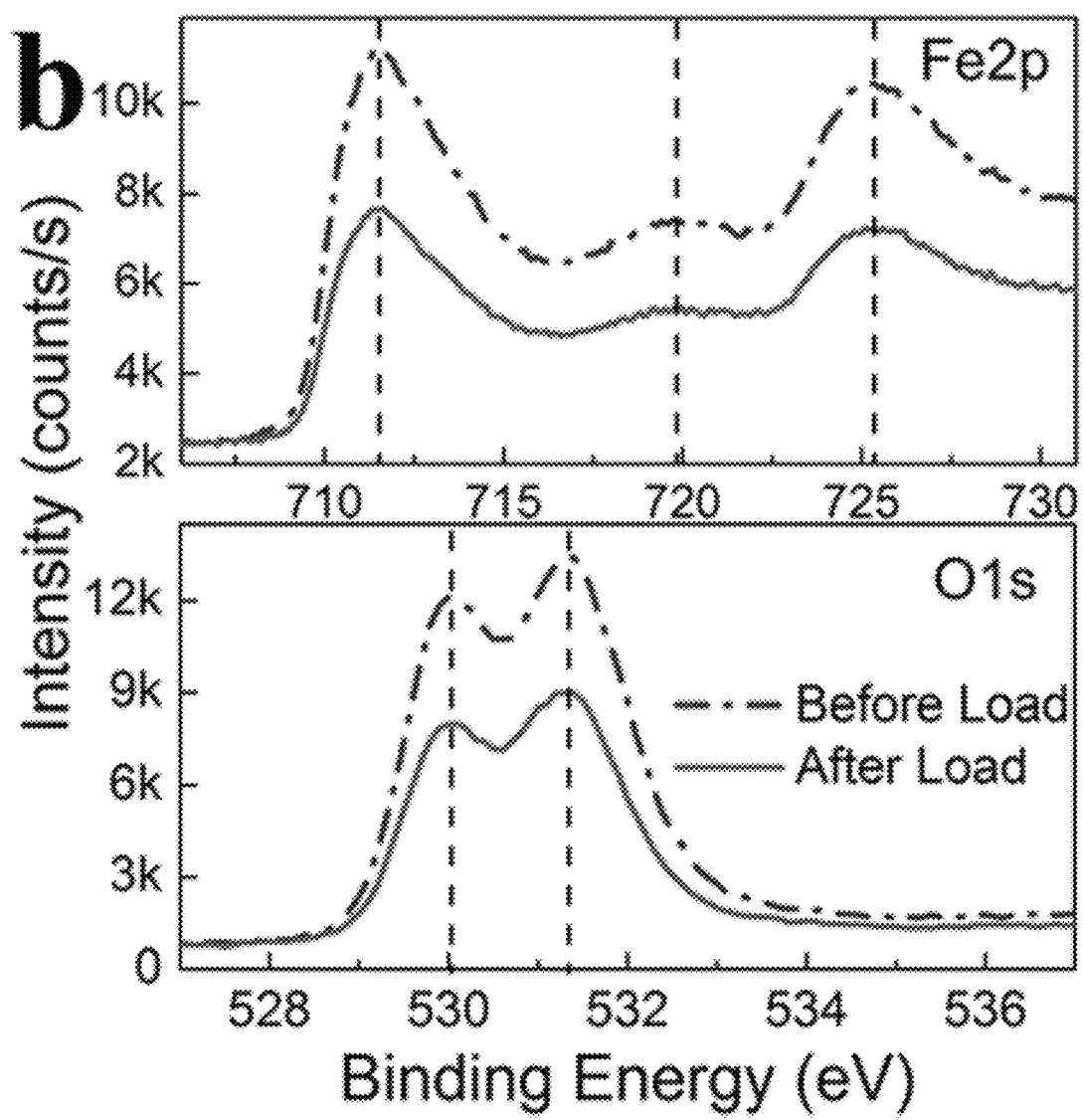
FIG. 14B shows XPS Fe 2p and O 1s spectra of the FeOOH thin film before and after Congo red loading according to an embodiment, showing similar oxidation states of iron and oxygen.

The chemical state of the surface was examined using XPS before and after adsorption. Firstly, the C 1s spectrum shown in FIG. 14A after the loading of the dye shows the clear presence of Congo red on the surface of the iron hydroxide thin film. This may be seen from the presence of additional C—C bonding from the Congo red molecules. In addition, due to the surface adsorption, O 1s and Fe 2p intensity were attenuated as shown in FIG. 14B. It was clear that there was no observable chemical shift in both the O 1s and Fe 2p spectra, before and after the Congo red adsorption. This was an important revelation given the chemisorption nature of the adsorption as it effectively eliminates the possibility of having chelating and bridging bidendate bond formation. Both such bondings were expected to alter the oxidation of oxygen and/or Fe. The inventors therefore concluded that the unidentate complex formation between Fe and —SO$_3$ via an oxygen was the most possible chemisorption mechanism for Congo red. This was similar to the conclusion found for Orange II adsorption on iron oxide surfaces using Fourier transform infrared spectroscopy studies.

There were a few implications for all the fundamental findings from the mechanistic studies. Theoretical capacity can now be estimated for FeOOH since it was a surface limited reaction with one dye reacting with each Fe ion. Assuming an orthorhombic structure with a density of 4.26 g cm$^{-3}$ for the FeOOH (goethite) disclosed herein, the inventors estimated the theoretical adsorption capacity for Congo red to be about 2000 mg g$^{-1}$. This showed that the present film was at about 7% of the theoretical capacity.

The theoretical capacity calculation may be extended to other forms of iron oxides/hydroxides in an aqueous medium since all the materials were expected to be hydrated on the surface. In a non-aqueous medium however, since the complexation required a direct coordination bonding with Fe, the selective displacement of either O or OH bonding will critically affect the relative adsorption capacity. This will be an interesting further work to better understand the bonding mechanism. Such an understanding will explain if there is any advantage in using FeOOH over materials such as Fe(OH)$_3$, Fe$_3$O$_4$ or Fe$_2$O$_3$.

Finally, the inventors were also able to understand the tradeoff in achieving a high capacity for coated films. While monolayer coatings may yield excellent capacity over the porous film, the lack of materials per unit area may reduce the total sorption amount. There was thus a balance between addition of more materials to create a higher exposed surface area and achievement of a high adsorption capacity. This also meant that a detailed understanding of the structural evolution during growth was required, and this will be relied upon to explain the different observed capacities for the electrodeposited film in this work.

EXAMPLE 8

Understanding Capacity Variations for Electrodeposited FeOOH

FeOOH removed the Congo red pollutant via a surface limited chemisorption process through the complexation of the sulfonic bonds with the Fe in a unidentate formation. Since the adsorption was surface limited, capacity of the material was essentially dependent on the active surface area per weight of the material. In a coated film approach, it was therefore important to understand the evolution of the structures during the growth and how it affected capacity of the material.

Figure 15A:
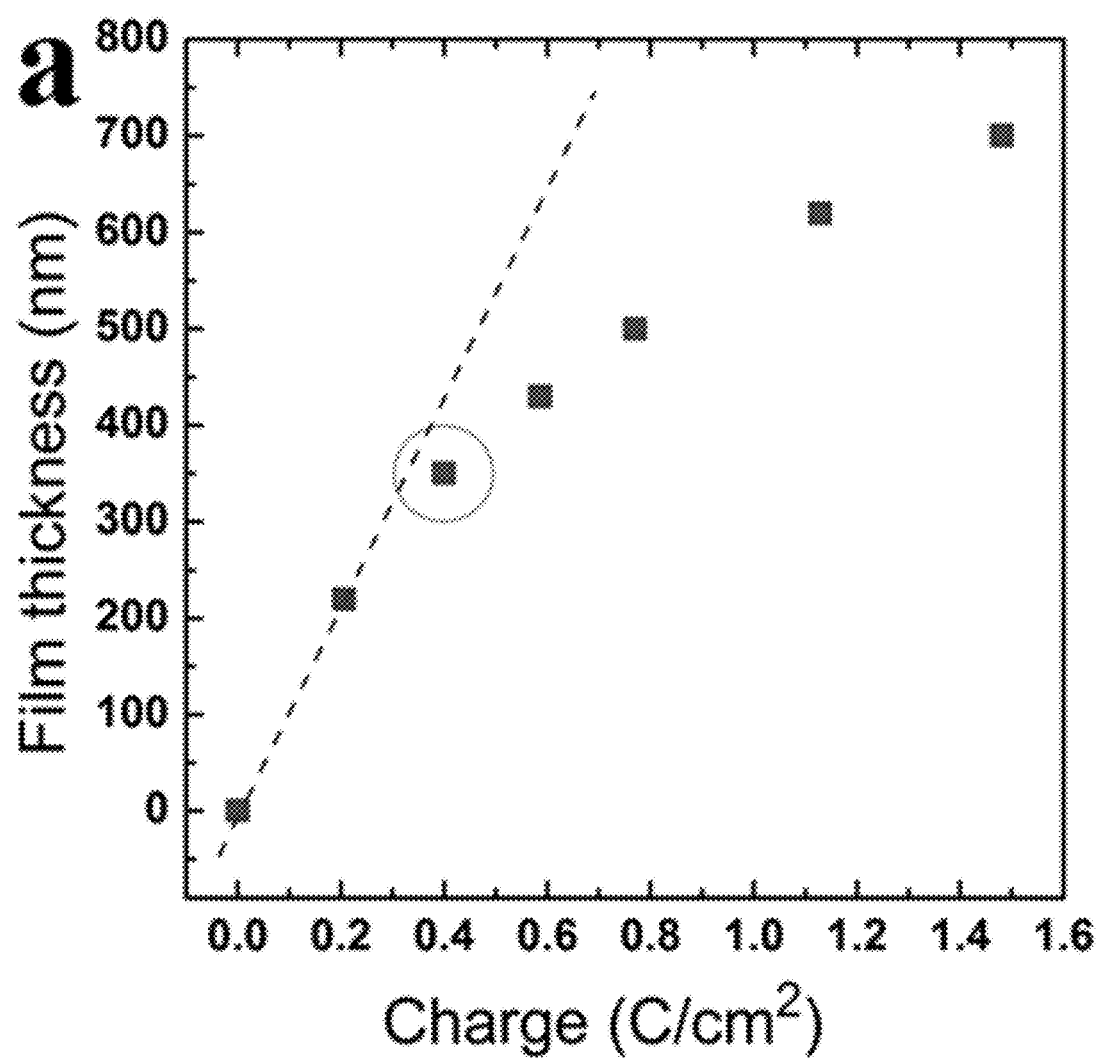
FIG. 15A shows film thickness as determined by cross-sectional SEM of FeOOH films on ITO versus deposition charge density measured during deposition according to embodiments.

FIG. 15A shows the measured film thickness variation with the recorded charge density during electrodeposition. It can be seen that the measured film thickness did not increase proportionally with the charge density. The deviation near the highlighted (circled) point can be explained by densification in the porous film growth. This was because the charge density which corresponded to the electrodeposited materials did not add to the thickness of the film. This was an indication that the materials were filling up the pores in the porous structured film.

Figure 15B:
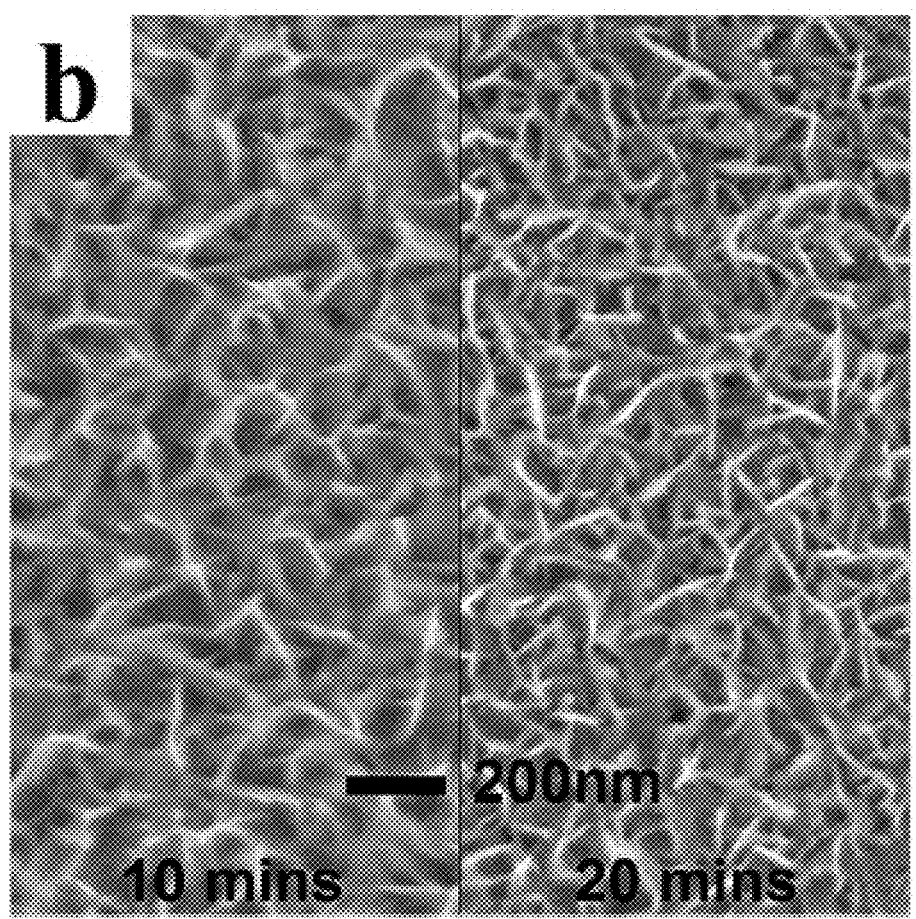
FIG. 15B shows SEM images of electrodeposited FeOOH films on ITO substrates obtained after 10 minutes (left) and 20 minutes (right) according to embodiments. Scale bar represents 200 nm.

This explanation was supported by the comparison of the planar SEM for the 10 and 20 min electrodeposited film as shown in FIG. 15B. The SEM micrographs showed significant densification of the coated film for longer growth durations. In addition, deviation from the linearity of the thickness occurred at around 0.4 C cm$^{-2}$. This corresponded to the about 300 nm porous film that yielded the best measured capacity, collaborating with the densification explanation.

The micrographs in FIG. 15B also show that the coated film is porous with about 10 to 30 nm thick fin-like structures. Such porosity and characteristic sizes were important to achieve the high adsorption capacity. The inventors carried out a quick comparison of the adsorption performance of coated FeOOH nanorods using hydrothermal techniques.

Figure 16A:
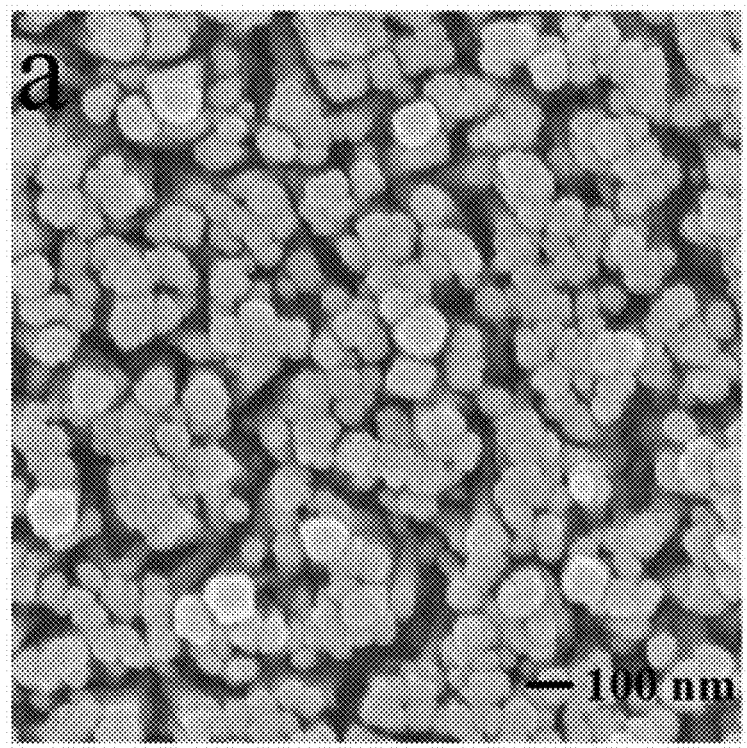
FIG. 16A is a SEM image of hydrothermally grown FeOOH according to an embodiment. The hydrothermally grown sample was accomplished by 6 hours of reaction at 100° C. in 10 mL of aqueous solution containing 1.5 mmol iron (III) chloride hexahydrate ($FeCl_3.6H_2O$) and 1.5 mmol urea ($NH_2CONH_2$). Scale bar represents 100 nm.
Figure 16B:
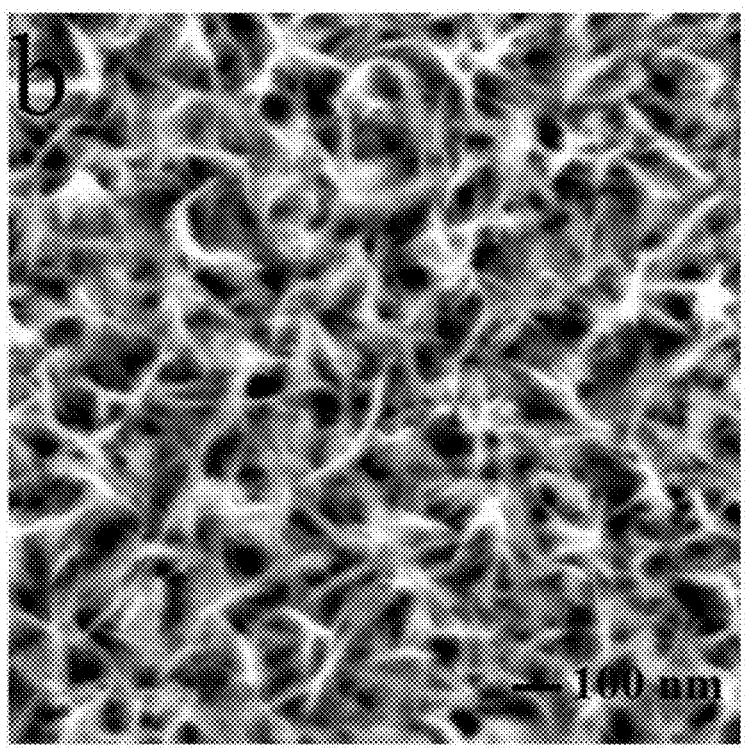
FIG. 16B is a SEM image of electrodeposited FeOOH according to an embodiment. The measured capacity of about 40 mg/g for hydrothermal grown FeOOH was lower than that for electrodeposited FeOOH reported in this work. Scale bar represents 100 nm.
Figure 17:
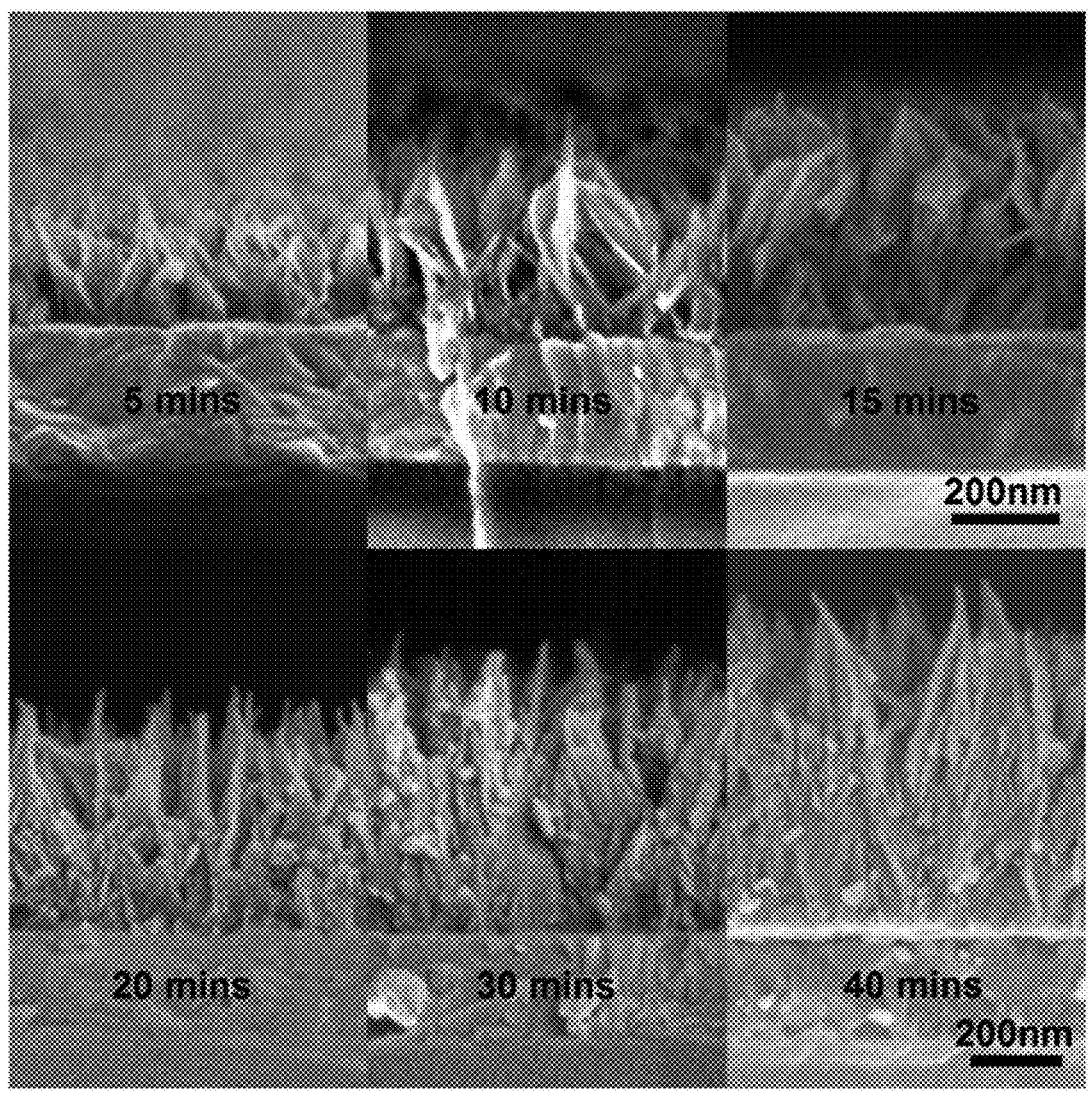
FIG. 17 shows cross-sectional SEM images of the 5, 10, 15, 20, 30 and 40 minutes coated FeOOH on ITO according to embodiments as indicated. Scale bar represents 200 nm. Fin-like elongation was observed for the first 10 minutes of growth. Subsequently, densification from the bottom of the film occurred as a competing pathway of growth.

The present coated nanorods have larger characteristic sizes and were comparatively less porous (FIG. 16A and FIG. 16B). While they yielded a decent capacity of about 40 mg g$^{-1}$, it was substantially less than the achievable capacity from the electrodeposited thin films. The importance of the porous fin-like structure and its relationship with the achieved capacity can be understood by comparing the cross-sectional SEM images of the 5, 10, 15, 20, 30 and 40 minute coated film as shown in FIG. 17.

Fin-like structures can be observed after the 5 and 10 minute growth where elongation of the fins occurred with increasing growth duration. This can account for the initial boost in the adsorption capacity due to the increased surface area. For the 15 minute growth, it is observed that densification of the lower part of the film begins, and this can mark the turning point of the specific adsorption capacity as the lower portion of the coated film starts to densify and limit the accessibility of the solvent.

For an even longer coating duration of 20 minutes, the densification of the film became more apparent as the substantial addition of material gave the fins a coarse and globule-like surface. This was intensified for the 30 and 40 minute coated samples, so much so that almost the entire lower portion of the film appeared to be without any porosity. As the inventors had determined that adsorption of Congo red was a surface limited chemisorption process, the structural evolution explained well the changes in the adsorption capacity.

The initial increase and high specific adsorption capacity recorded can be attributed to the formation of an elongated fin-like structure that improved the specific surface area and this was the key to the excellent performance demonstrated.

Thereafter, length of the fins may be of hindrance to further elongation as the potential drop can slow down or impede further electrodeposition at the tip of the fin.

In void of elongation, a competing growth pathway from near the substrate may dominate. This growth at the bottom of the porous structure caused the densification of the coated film. The porous nature at the lower part of the film was therefore effectively removed at a longer growth duration and this was detrimental to the specific adsorption capacity.

EXAMPLE 9

An Embodiment

Iron hydroxide was coated on metal foam, in particular, nickel foam. The deposition bath contained mixture of 0.1 M $(NH_4)_2Fe(SO_4)_2$ and 0.2 M $CH_3COONa$ solution. pH of the solution, a critical factor affecting coating morphology and growth rate, was adjusted to 6.5. This may vary in consideration of the electropotential applied.

The electropotential may be optimized or increased to promote field driven elongation of surfaces. This may, however, be countered by bottom up filling that negated the increase of porosity. The adjustment of pH can limit the diffusion of OH$^-$ species, which was necessary for the reaction process in this growth formula. The reaction process on tip front wass not as seriously affected as on the bottom since access to OH$^-$ species was not restricted by diffusion. Thus, pH controls at selected potential may decide the rate of the bottom up filling. On the other hand, bottom up pores filling may be desired as it may help in the adhesion of the coatings on the substrate. Therefore, a balance should be obtained.

Figure 19:
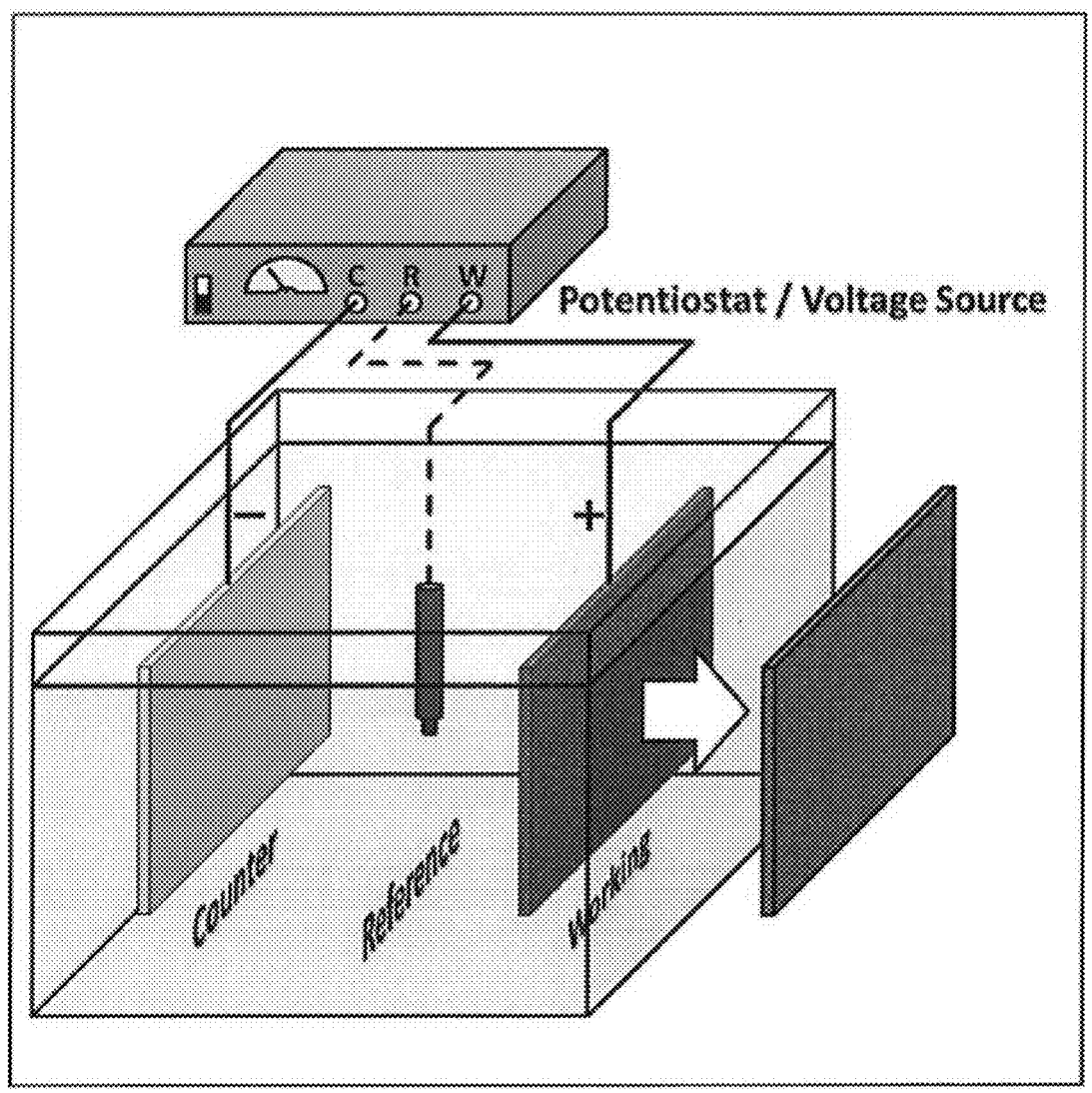
FIG. 19 is a schematic diagram showing coating setup using voltage source (with counter and working electrodes) or potentiostat system (with additional reference electrode) according to an embodiment.

The inventors stated the optimized condition to include a process in purged nitrogen condition to prevent precipitation. After settling for 30 min, the electro-deposition on the porous substrate was conducted at room temperature under a constant voltage of 0.5 V relative to a 3M Ag/AgCl reference electrode for 10 minutes, while inert platinum sheet was used as counter electrode. The setup was illustrated graphically in FIG. 19.

Use of reference electrode thus the potentiostat system was optional if the process was standardized with identical substrate and deposition condition. In this case, a simple voltage source was enough to enable coating process.

Figure 20:
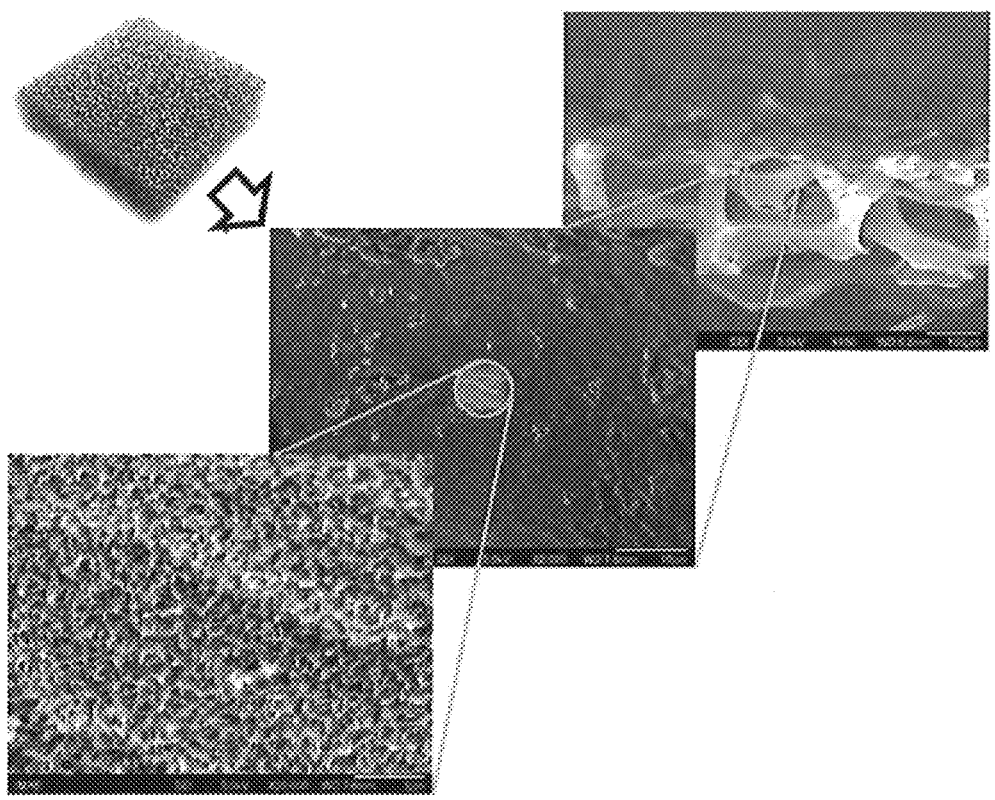
FIG. 20 shows SEM images of metal hydroxide adsorbent coating on metal foam according to an embodiment.
Figure 21:
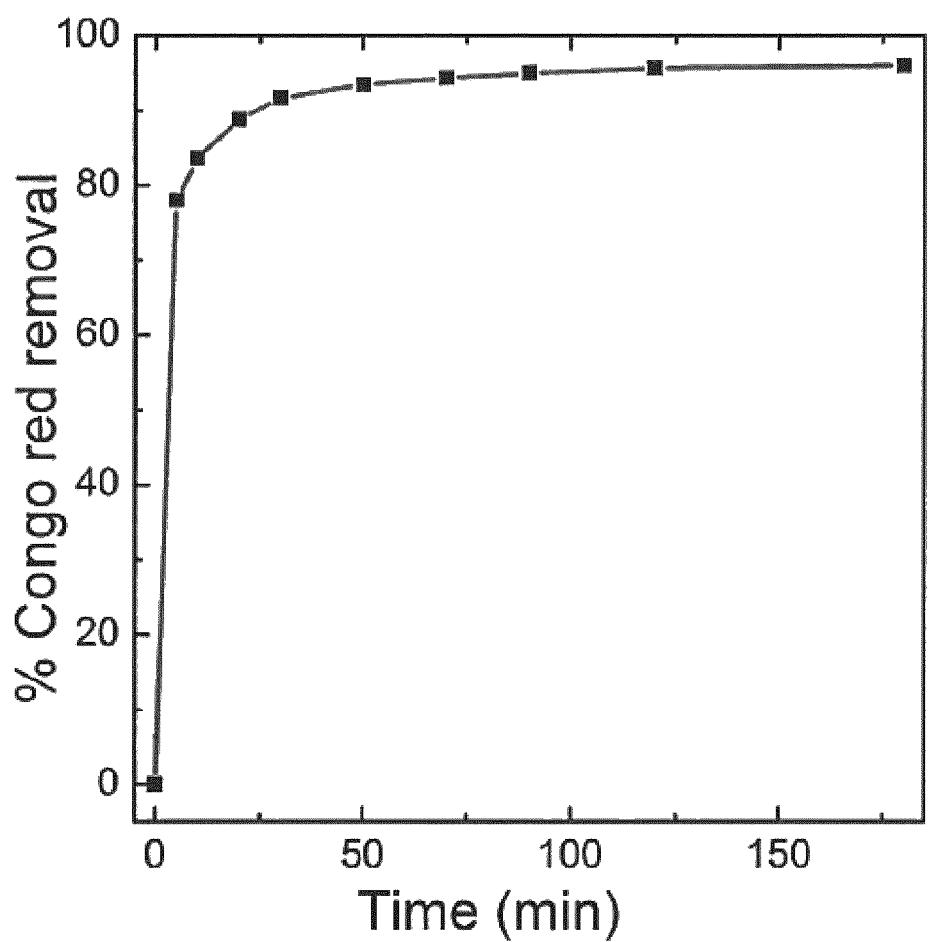
FIG. 21 shows adsorption performance (percentage removal of Congo red over time) of the optimized coating according to an embodiment.

SEM images of the porous iron hydroxide coating on Ni foam were shown in FIG. 20, which illustrated the success in coating a porous layer on a porous substrate. Using the proposed optimized conditions, the resulting adsorbent can effectively remove Congo red, a typical azo dye, using an insertion-extraction method, as effective as commercial available adsorbent powder or granules as shown in FIG. 4.

Comparison of the adsorption capacity of the proposed technology and the commercial and developing adsorbents was shown in TABLE 3.

TABLE 3

Adsorption capacity for Congo red by various commercial and developing adsorbents

| Adsorbent Material | Form | Capacity (mg/g) | Reference |
| --- | --- | --- | --- |
| Porous Iron Hydroxide Coating | Continuous | 144 | This work |
| Commercial activated carbon (AC) | Powder | 70 | [1] |
| Commercial AC | Powder | 0.2 | [2] |
| Lab-grade AC | Powder | 1.5 | [2] |
| Modified AC (Fe catalyzed activation) | Powder | 100 | [1] |
| Modified AC (Pd) | Powder | 77 | [3] |
| Modified AC (Ag) | Powder | 67 | [3] |
| Modified AC (ZnO) | Powder | 142 | [3] |
| Synthesized AC (from coal) | Powder | 189 | [4] |
| Synthesized AC (from pomegranate) | Powder | 19 | [5] |

TABLE 3-continued

Adsorption capacity for Congo red by various commercial and developing adsorbents

| Adsorbent Material | Form | Capacity (mg/g) | Reference |
|---|---|---|---|
| Synthesized AC (from coir pith) | Powder | 6.72 | [6] |
| Modified Red mud | Powder | 7.06 | [7] |
| Chitosan | Powder | 92.59 | [8] |
| Commercial Zeolite | Powder | 3.77 | [9] |
| Commercial Kaolin | Powder | 5.44 | [9] |
| Commercial Sodium Bentonite | Powder | 35.84 | [9] |
| Commercial $Fe_2O_3$ | Powder | 42.4 | [10] |
| $Fe_2O_3$ | Powder | 66 | [11] |
| $Fe_2O_3$ | Nanoparticle | 253.8 | [10] |
| $Fe_2O_3$ | Nanoparticle | 208.3 | [12] |
| $Fe_2O_3$ | Nanoparticle | 160 | [13] |
| Mg/Al Hydroxide Nanoflakes | Nanoparticle | 585 | [14] |
| $NiO$—$SiO_2$ Microspheres | Powders | 204 | [15] |
| Multiwall Carbon Nanotube | Nanoparticle | 148 | [16] |

REFERENCES

[1] W. Z. Shen, et al. Studies in Surface Science and Catalysis, 146, 779-782, 2003
[2] I. D. Mall, et al. Chemosphere, 61, 492-501, 2005
[3] M. Ghaedi, et al. Materials Science and Engineering C, 32, 725-734, 2012
[4] E. Lorenc-Grabowska, et al. Dyes and Pigments, 74, 34-40, 2007
[5] M. Ghaedi, et al. Spectrochimica Acta A, 86, 107-114, 2012
[6] C. Namasivayam, et al. Dyes and Pigments, 54, 47-58, 2002
[7] A. Tor, et al. Journal of Hazardous Materials, B138, 409-415, 2006
[8] S. Chatterjee, et al. Colloids and Surfaces A, 299, 146-152, 2007
[9] V. Vimonses, et al. Chemical Engineering Journal, 148, 354-364, 2009
[10] T. Hao, et al. Applied Surface Science, 292, 174-180, 2014
[11] C. Yu, et al. Journal of physical Chemistry C, 112, 13378-13382, 2008,
[12] A. Afkhami, et al. The Journal of Hazardous Materials, 174, 398-403, 2010
[13] Z. Wei, et al. ACS Applied Materials & interfaces, 5, 598-604, 2013
[14] J. Li, et al. Journal of Material Chemistry A, 4, 1737-1746, 2016
[15] C. Lei, et al. Journal of Colloid and Interface Science, 466, 238-246, 2016
[16] A. K. Mishra, et al. Chemical Engineering Journal, 162, 1026-1034, 2010

It should be noted that the proposed technology demonstrated superior adsorption performance compared to various commercial adsorbents, while showing comparable performance as the developing nanomaterials.

Figure 22:
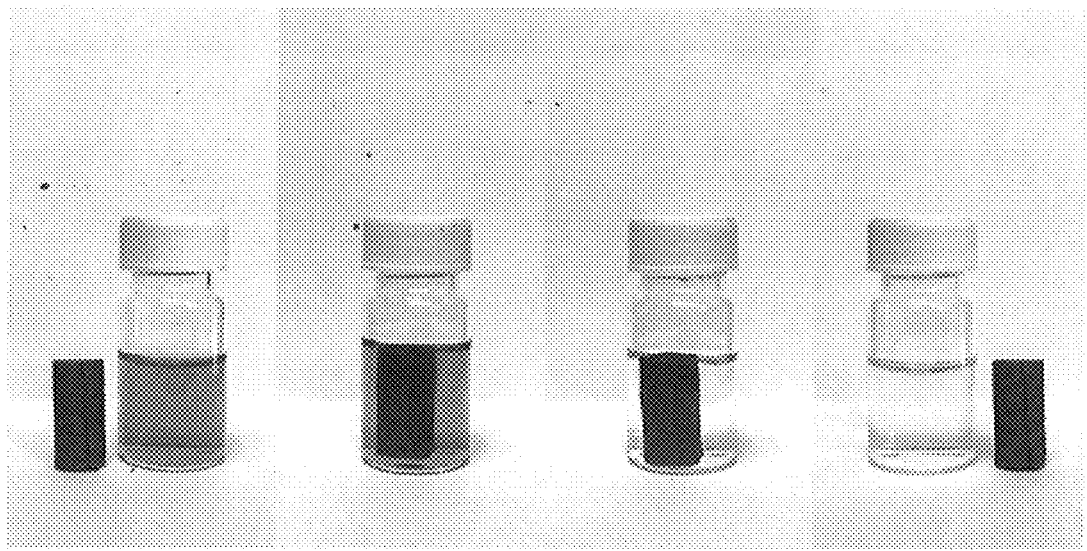
FIG. 22 are photographs showing bulk insertion and extraction operation of dip-in adsorbent roll according to an embodiment in the process of removing organic dye from contaminated water.
Figure 23:
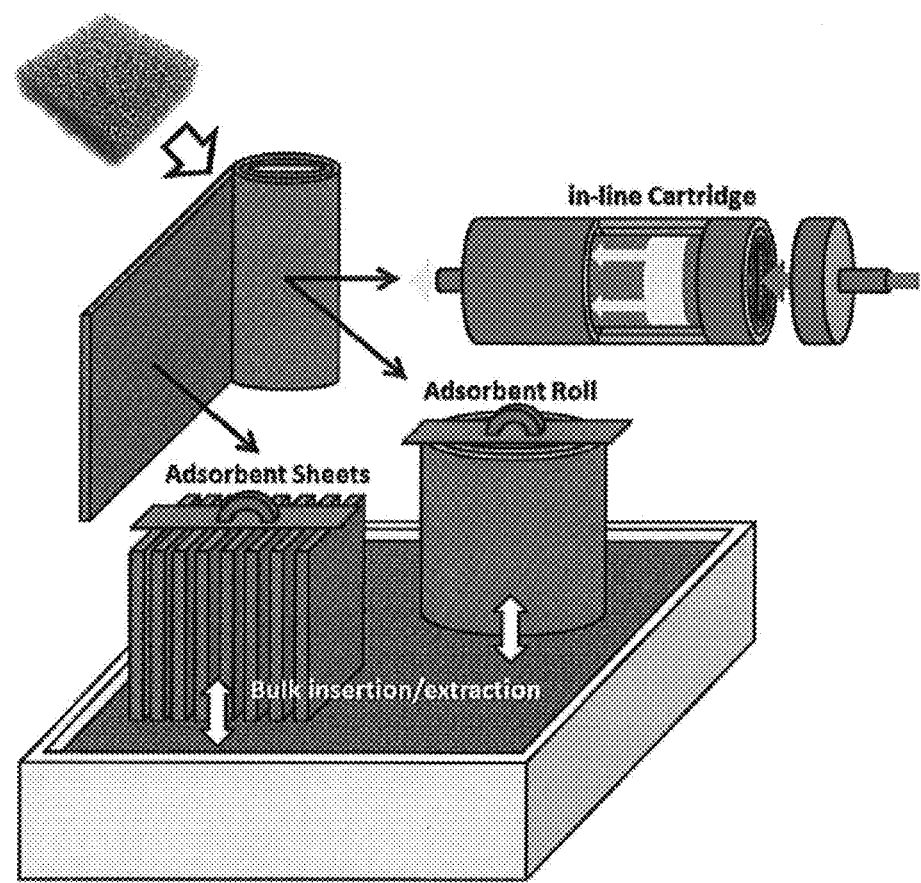
FIG. 23 is a schematic diagram showing various adsorbent devices according to embodiments developed from the coated porous substrate.

The inventors have demonstrated the operation of the extractable porous substrate in the form of a roll as shown in FIG. 22. Other shapes and configurations can be envisioned either as parallel sheets or multiple rolls based on the space constraint as shown in FIG. 23. For example, the rolls may be favored for in-line adsorptive cartridges as illustrated in FIG. 23.

Finally, one added advantage of using an extractable porous substrate is the increased methods of regeneration. The regeneration of the proposed adsorbent material can now proceed by electrochemical methods, dipping method and thermal methods, without a need to handle powder or nanomaterials. The inventors have shown about 89% regeneration using simple dipping in alkali solution.

A comparison of the material and operational cost of the proposed technology and the state-of-the-art adsorbents is shown in TABLE 4.

TABLE 4

Cost comparison between proposed technology and commercial adsorbents

| Adsorbent | Material Cost* USD/Ton | Operational Cost* USD/Ton | Regeneration Cost* USD/Ton |
|---|---|---|---|
| Proposed Technology | Coating 270 Substrate 500 | 0 | Regenerate (11% loss) 450 Refurbish (0% loss) 300 |
| AC (coconut shell) | 1000-5000 | Treatment Plant (>100 L) | incineration (15% loss)[17] |
| AC (Coal) | 500-2000 | 10000-50000/set | 1400 |
| AC (wood dust) | 800-2000 | 3000 | |
| Activate Alumina | 800-1500 | Cartridge/filter (0.5-3 L) | |
| Silica Gel | 800-1200 | 1-5/piece | |
| Zeolite | 1000-2500 | 2000 | |
| Chitosan | 900-20000 | | |

*All cost for commercial adsorbent and chemicals are quoted from www.alibaba.com The proposed technology has advantages in both material and operational cost showing its practicality of implementation and market competitiveness.

EXAMPLE 10

Conclusions

The inventors demonstrated the high adsorption efficiency of coated FeOOH for Congo red pollutants. This was the first demonstration of an adsorption process for the complete immobilization of pollutants on a rigid substrate that can be easily removed in a water treatment process. A high removal efficiency of more than 140 mg $g^{-1}$ was achieved using an environmentally friendly deposition method at room temperature. The inventors also showed through kinetic and mechanism studies that FeOOH essentially immobilizes the dye via a unidentate chemisorption process that was highly surface limited. Using this understanding, the inventors estimated that the coated FeOOH yielded about 7% of the theoretically achievable capacity, showing the potential for improvements. The inventors also elucidated that the obtained efficiency may be attributed to the highly exposed surface area that came with the formation of an elongated fin-like structure film in an optimized electrodeposition process.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An adsorbent material comprising:
   a) a porous, non-particulate substrate comprising pores having a size in the range of about 1 μm to about 1 mm, and
   b) a conformal coating film deposited on the porous, non-particulate substrate, wherein the conformal coating film comprises topographical features having a feature size in the range of about 1 nm to about 1 μm, and wherein the topographical features comprises fin-like nanostructures having a profile thickness in the range of about 100 nm to about 400 nm.

2. The adsorbent material according to claim 1, wherein the porous, non-particulate substrate is a metal foam.

3. The adsorbent material according to claim 1, wherein the porous, non-particulate substrate is non-rigid.

4. The adsorbent material according to claim 1, wherein the porous, non-particulate substrate has at least one dimension that is about 5 cm or more.

5. The adsorbent material according to claim 1, wherein the conformal coating film comprises a substance adapted to adsorb a dye molecule by chemisorption.

6. The adsorbent material according to claim 1, wherein the conformal coating film comprises a substance adapted to adsorb a dye molecule through complexation via at least one of a chelating bidentate, bridging bidentate, or unidentate bonding with the dye molecule.

7. The adsorbent material according to claim 1, wherein the conformal coating film comprises at least one of a metal oxide or a metal hydroxide.

8. The adsorbent material according to claim 1, wherein the conformal coating film comprises FeOOH.

9. A method of preparing an adsorbent material, the method comprising:
   a) providing a porous, non-particulate substrate comprising pores having a size in the range of about 1 μm to about 1 mm, and
   b) depositing a conformal coating film on the porous, non-particulate substrate, wherein the conformal coating film comprises topographical features having a feature size in the range of about 1 nm to about 1 μm, and wherein the topographical features comprises fin-like nanostructures having a profile thickness in the range of about 100 nm to about 400 nm.

10. The method according to claim 9, wherein depositing the conformal coating film on the porous, non-particulate substrate comprises electrodepositing a substance adapted to adsorb a dye molecule by chemisorption on the porous, non-particulate substrate.

11. The method according to claim 9, wherein depositing the conformal coating film on the porous, non-particulate substrate comprises electrodepositing at least one of a metal oxide or a metal hydroxide on the porous, non-particulate substrate.

12. The method according to claim 9, wherein depositing the conformal coating film on the porous, non-particulate substrate comprises electrodepositing FeOOH on the porous, non-particulate substrate.

13. The method according to claim 9, wherein the electrodeposition is carried out at a pH in the range of about 6 to about 7.

14. The method according to claim 9, wherein the electrodeposition is carried out in a purged nitrogen environment.

15. The method according to claim 9, wherein the electrodeposition is carried out without heating.

16. The method according to claim 9, wherein the electrodeposition is carried out under constant potential.

17. An adsorbent device comprising
   a) a support structure, and
   b) a plurality of an adsorbent material attached to the support structure, the adsorbent material comprising a porous, non-particulate substrate comprising pores having a size in the range of about 1 μm to about 1 mm, and a conformal coating film deposited on the porous, non-particulate substrate, wherein the conformal coating film comprises topographical features having a feature size in the range of about 1 nm to about 1 μm, and wherein the topographical features comprises fin-like nanostructures having a profile thickness in the range of about 100 nm to about 400 nm.

18. The adsorbent device according to claim 17, wherein the support structure is selected from the group consisting of metals, polymers, ceramics, and combinations thereof.

19. The adsorbent device according to claim 17, wherein the plurality of the adsorbent material are in the form of rolled sheets and/or parallel sheets.

* * * * *